US012798569B2

(12) United States Patent
Yamazaki

(10) Patent No.: US 12,798,569 B2
(45) Date of Patent: Nov. 17, 2026

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventor: Taku Yamazaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 100 days.

(21) Appl. No.: 18/888,649

(22) Filed: Sep. 18, 2024

(65) Prior Publication Data

US 2025/0108797 A1 Apr. 3, 2025

(30) Foreign Application Priority Data

Sep. 29, 2023 (JP) ................................ 2023-170822

(51) Int. Cl.
*B60W 30/095* (2012.01)
*B60W 60/00* (2020.01)
*H04W 4/46* (2018.01)

(52) U.S. Cl.
CPC .... *B60W 30/0956* (2013.01); *B60W 60/0027* (2020.02); *H04W 4/46* (2018.02);
(Continued)

(58) Field of Classification Search
CPC ......... B60W 30/0956; B60W 60/0027; B60W 2554/4041; B60W 2554/4042;
(Continued)

(56) References Cited

U.S. PATENT DOCUMENTS 9,830,822 B2 11/2017 Ando et al.
10,269,247 B2 4/2019 Ando
(Continued)

FOREIGN PATENT DOCUMENTS

JP 2006184942 A * 7/2006 ............ G08G 1/166
JP 2017091502 A * 5/2017
(Continued)

OTHER PUBLICATIONS

JP 2017091502 A (Year: 2017).*
(Continued)

*Primary Examiner* — Roy Rhee
(74) *Attorney, Agent, or Firm* — Thomas Horstemeyer, LLP

(57) ABSTRACT

The present invention provides a driving assistance device configured to store a plurality of intersection locations each indicating a location where traveling trajectories of a self-vehicle and another vehicle intersect in a past; acquire information of a surrounding vehicle; predict a possibility of collision between the self-vehicle and the surrounding vehicle in a target area based on the information; and perform driving assistance for the self-vehicle based on a prediction result, wherein in a case where none of the plurality of intersection locations is present within a predetermined distance, the possibility of collision is predicted by setting the target area to a first area, and in a case where at least one of the plurality of intersection locations is present within the predetermined distance, the possibility of collision is predicted by setting the target area to a second area.

16 Claims, 15 Drawing Sheets

(52) U.S. Cl.
CPC ............... *B60W 2554/4041* (2020.02); *B60W 2554/4042* (2020.02); *B60W 2554/4044* (2020.02)

(58) Field of Classification Search
CPC ..... B60W 2554/4044; B60W 30/0953; B60W 30/18154; H04W 4/46
See application file for complete search history.

(56) References Cited

U.S. PATENT DOCUMENTS

| | | | | |
|---|---|---|---|---|
| 10,304,337 | B2 | 5/2019 | Ando | |
| 11,100,804 | B2 | 8/2021 | Kurehashi | |
| 12,208,793 | B2 | 1/2025 | Hagiwara et al. | |
| 2019/0287406 | A1 | 9/2019 | Kurehashi | |
| 2022/0289178 | A1* | 9/2022 | Hagiwara | B60W 30/0953 |

FOREIGN PATENT DOCUMENTS

| | | | | | |
|---|---|---|---|---|---|
| JP | 2017-111576 | A | | 6/2017 | |
| JP | 2017-126219 | A | | 7/2017 | |
| JP | 2019142300 | A | * | 8/2019 | |
| JP | 7054636 | B2 | | 4/2022 | |
| JP | 2022-138596 | A | | 9/2022 | |
| JP | 2023-132318 | A | | 9/2023 | |
| JP | 2023-132319 | A | | 9/2023 | |
| JP | 2024072009 | A | * | 5/2024 | G08G 1/166 |

OTHER PUBLICATIONS

JP 2006184942 A (Year: 2006).*
JP-2024072009-A (Year: 2024).*
JP 2019142300 A (Year: 2019).*
Japanese Office Action for Japanese Patent Application No. 2023-170822 mailed May 30, 2025 (partially translated).

* cited by examiner

FIG. 2

| INTERSECTION POSITION ID | REGISTRATION DATE AND TIME | COORDINATES | PASSING AZIMUTH |
|---|---|---|---|
| 0001 | 2022/09/aa | P1 (X1, Y1) | 21° |
| 0002 | 2022/09/bb | P2 (X2, Y2) | 285° |
| 0003 | 2022/10/cc | P3 (X3, Y3) | 53° |
| 0004 | 2022/11/dd | P4 (X4, Y4) | 92° |
| ⋮ | | | |
| nnnn | 2023/08/ee | Pn(Xn, Yn) | 165° |
| ⋮ | | | |

DRIVING ASSISTANCE DEVICE, DRIVING ASSISTANCE METHOD, AND STORAGE MEDIUM

CROSS-REFERENCE TO RELATED APPLICATION(S)

This application claims priority to and the benefit of Japanese Patent Application No. 2023-170822 filed on Sep. 29, 2023, the entire disclosure of which is incorporated herein by reference.

BACKGROUND OF THE INVENTION

Field of the Invention

The present invention relates to a driving assistance device, a driving assistance method, and a storage medium.

Description of the Related Art

There is known a device that performs driving assistance for preventing a collision with another vehicle (surrounding vehicle) or the like without using map information. Japanese Patent No. 7054636 discloses a driving assistance device that registers, in a storage unit, location information of an intersection where a traveling trajectory of a self-vehicle and a traveling trajectory of another vehicle intersect and performs driving assistance for the self-vehicle when the self-vehicle passes through the intersection again.

In the driving assistance device, a possibility of collision of the self-vehicle in the target area in front of the self-vehicle can be predicted, and driving assistance for the self-vehicle can be performed based on the prediction result. However, for example, in the case of entering a main road including a plurality of lanes, even if an intersection location (intersection) where the traveling trajectory of the self-vehicle and the traveling trajectory of another vehicle intersected in the past is stored for the main road, the intersection location may not be included in the target area where driving assistance is performed, and accordingly, driving assistance may not be appropriately provided.

SUMMARY OF THE INVENTION

The present invention provides, for example, a technique capable of appropriately performing driving assistance for a self-vehicle.

According to one aspect of the present invention, there is provided a driving assistance device, comprising: a storage unit configured to store a plurality of intersection locations each indicating a location where a traveling trajectory of a self-vehicle and a traveling trajectory of another vehicle intersect with each other in a past; an acquisition unit configured to acquire surrounding vehicle information including a current location, a speed, and a traveling trajectory of a surrounding vehicle present around the self-vehicle, from the surrounding vehicle, through vehicle-to-vehicle communication; a prediction unit configured to predict a possibility of collision between the self-vehicle and the surrounding vehicle in a target area in front of the self-vehicle based on self-vehicle information including a current location, a speed, and a traveling trajectory of the self-vehicle and the surrounding vehicle information acquired by the acquisition unit; and an assistance unit configured to perform driving assistance for the self-vehicle, which includes at least one of notification to an occupant of the self-vehicle and deceleration assistance for the self-vehicle, based on a prediction result of the prediction unit, wherein the prediction unit predicts, in a case where none of the plurality of intersection locations stored in the storage unit is present within a predetermined distance in front of the self-vehicle, the possibility of collision by setting the target area to a first area, and predicts, in a case where at least one of the plurality of intersection locations stored in the storage unit is present within the predetermined distance, the possibility of collision by setting the target area to a second area larger than the first area.

Further features of the present invention will become apparent from the following description of exemplary embodiments with reference to the attached drawings.

BRIEF DESCRIPTION OF THE DRAWINGS

FIG. 2 is a diagram illustrating a configuration example of an intersection location database;

DESCRIPTION OF THE EMBODIMENTS

Figure 1:
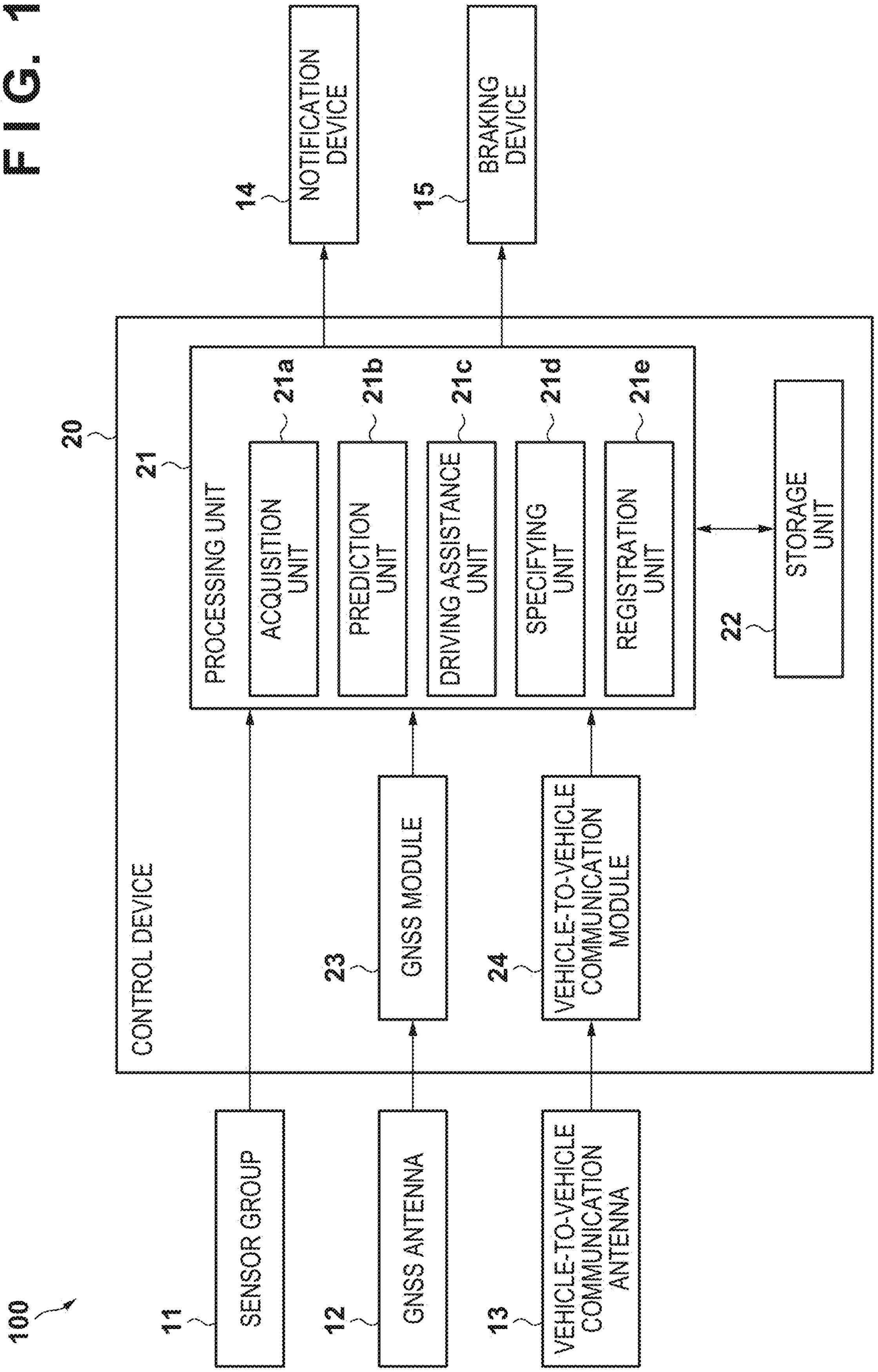
FIG. 1 is a diagram illustrating a configuration example of a driving assistance device according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Configuration of Driving Assistance Device

FIG. 1 is a diagram illustrating a configuration example of a driving assistance device 100 according to an embodiment of the present invention. The driving assistance device 100 is a device mounted on a self-vehicle in order to perform driving assistance for the self-vehicle. In the case of the present embodiment, the driving assistance device 100 performs collision prevention assistance for preventing (reducing) a collision with a surrounding vehicle as driving assistance for the self-vehicle without using map information. In addition, the driving assistance device 100 according to the present embodiment may include a sensor group 11, a global navigation satellite system (GNSS) antenna 12, a vehicle-to-vehicle communication antenna 13, a notification device 14, a braking device 15, and a control device 20. Note that, in the following description, "another vehicle" indicates all vehicles different from the self-vehicle, and specifically, can be defined as a vehicle that performs vehicle-to-vehicle communication with the self-vehicle. In addition, the "surrounding vehicle" indicates a vehicle that is currently present around the self-vehicle, and specifically, is defined as a vehicle that currently performs vehicle-to-vehicle communication with the self-vehicle.

The sensor group 11 includes various sensors mounted on the self-vehicle in order to perform driving assistance for the self-vehicle. For example, the sensor group 11 may include a speed sensor that detects the speed of the self-vehicle, an acceleration sensor that detects the acceleration of the self-vehicle, and the like. In addition, the sensor group 11 may include an external detection sensor such as a camera, a millimeter wave radar, or a light detection and ranging (LiDAR) capable of detecting an object around the self-vehicle. The sensor group 11 outputs the detection result to the control device 20.

The GNSS antenna 12 receives a radio wave for location measurement transmitted from a GNSS satellite. For example, the GNSS antenna 12 may be used to acquire information regarding the current location of the self-vehicle. The vehicle-to-vehicle communication antenna 13 is an antenna that transmits and receives various kinds of data to and from surrounding vehicles. For example, the vehicle-to-vehicle communication antenna 13 may be used to acquire information regarding the current location, speed, and traveling trajectory of a surrounding vehicle.

The notification device 14 is a device that provides notification to an occupant (for example, a driver) of the self-vehicle. When there is a possibility that the self-vehicle collides with a surrounding vehicle, the driving assistance device 100 according to the present embodiment can notify the occupant of the self-vehicle of the possibility of collision with the surrounding vehicle, as driving assistance, through the notification device 14. For example, the notification device 14 may include a display unit, such as a display, and display information indicating a possibility of collision with a surrounding vehicle on the display unit, or may include a sound output unit, such as a speaker, and output information indicating a possibility of collision with a surrounding vehicle from the sound output unit by sound or the like.

The braking device 15 is, for example, a brake, and is a device for performing a braking operation of the self-vehicle. When there is a possibility that the self-vehicle collides with a surrounding vehicle, the driving assistance device 100 according to the present embodiment can perform deceleration assistance for the self-vehicle by operating the braking device 15 as driving assistance, thereby avoiding a collision with the surrounding vehicle.

The control device 20 is a device (computer) that controls driving assistance for the self-vehicle, and may be, for example, an electric control unit (ECU). The control device 20 according to the present embodiment performs driving assistance by vehicle-to-vehicle communication with another vehicle (surrounding vehicle) and processing in the self-vehicle. That is, the control device 20 performs driving assistance without using map information. The control device 20 includes a processing unit 21, a storage unit 22, a GNSS module 23, and a vehicle-to-vehicle communication module 24, which are connected to each other by a bus (not illustrated).

The processing unit 21 is a processor represented by a central processing unit (CPU), and executes a program stored in the storage unit 22. The storage unit 22 includes, for example, a RAM, a ROM, and a hard disk, and stores various kinds of data in addition to a program (driving assistance program) for the processing unit 21 to perform the driving assistance processing for the self-vehicle. In the case of the present embodiment, the storage unit 22 stores a database (information) of a plurality of intersection locations each indicating a location where the traveling trajectory of the self-vehicle and the traveling trajectory of another vehicle intersected in the past. In addition, the GNSS module 23 receives location information and the like of the self-vehicle from the GNSS satellite through the GNSS antenna 12. In addition, the vehicle-to-vehicle communication module 24 receives various kinds of information from another vehicle through the vehicle-to-vehicle communication antenna 13.

The processing unit 21 according to the present embodiment may include an acquisition unit 21*a*, a prediction unit 21*b*, a driving assistance unit 21*c*, a specifying unit 21*d*, and a registration unit 21*e* in order to perform driving assistance (collision prevention assistance in the present embodiment) for the self-vehicle. In addition, the processing unit 21 is not limited to the configuration including the units 21*a* to 21*e*, and another unit may be added or some units may be omitted according to the type of driving assistance performed by the self-vehicle.

The acquisition unit 21*a* acquires surrounding vehicle information including the current location, speed, and traveling trajectory of the surrounding vehicle from the surrounding vehicle through the vehicle-to-vehicle communication antenna 13 (vehicle-to-vehicle communication module 24). The acquisition unit 21*a* may also have a function of acquiring self-vehicle information including the current location, speed, and traveling trajectory of the self-vehicle through the sensor group 11 and the GNSS antenna 12 (GNSS module 23).

The prediction unit 21*b* predicts the possibility of collision of the self-vehicle in a target area in front of the self-vehicle based on the self-vehicle information and the surrounding vehicle information acquired by the acquisition unit 21*a*. The target area will be described in detail later, but may be understood as an area (driving assistance area) to be subjected to driving assistance for preventing a collision between the self-vehicle and a surrounding vehicle. In addition, the driving assistance unit 21*c* performs driving assistance for preventing a collision between the self-vehicle and a surrounding vehicle based on the prediction result in the prediction unit 21*b*. In the case of the present embodiment, the driving assistance unit 21*c* can perform, as driving assistance for the self-vehicle, at least one of notification to an occupant of the self-vehicle by the notification device 14 and deceleration assistance for the self-vehicle by the braking device 15.

Based on the self-vehicle information and the surrounding vehicle information acquired by the acquisition unit 21*a*, the specifying unit 21*d* specifies a location where the self-vehicle and the surrounding vehicle intersect as a new intersection location. When the new intersection location is specified by the specifying unit 21*d*, the registration unit 21*e* registers the new intersection location specified by the specifying unit 21*d* in the storage unit 22 (a database of a plurality of intersection locations).

Next, a database of a plurality of intersection locations stored in the storage unit 22 will be described. FIG. 2 illustrates a configuration example of a database of a plurality of intersection locations stored in the storage unit 22. In addition, hereinafter, a database of a plurality of intersection locations stored in the storage unit 22 may be referred to as an "intersection location database", and an intersection location registered in the intersection location database may be referred to as a "registered intersection location". In addition, the intersection location database illustrated in FIG. 2 is merely an example, and items included in the intersection location database can be changed as appropriate.

The intersection location database may include, for each registered intersection location, information regarding the intersection location ID, registration date and time, coordinates, and passing azimuth. The intersection location ID is an identification number for each registered intersection location. The registration date and time is the date and time when the registered intersection location is registered in the intersection location database. The coordinates are data for specifying the registered intersection location, and are represented by, for example, latitude and longitude data. The coordinates may include altitude data, such as an elevation, in addition to latitude and longitude data. The passing azimuth is an azimuth (direction, angle) in which the self-vehicle faces when passing through the registered intersection location. In the present embodiment, the passing azimuth of the self-vehicle at the registered intersection location is defined by setting the north direction to 0°, the east direction to 90°, the south direction to 180°, and the west direction to 270°.

Figure 3B:
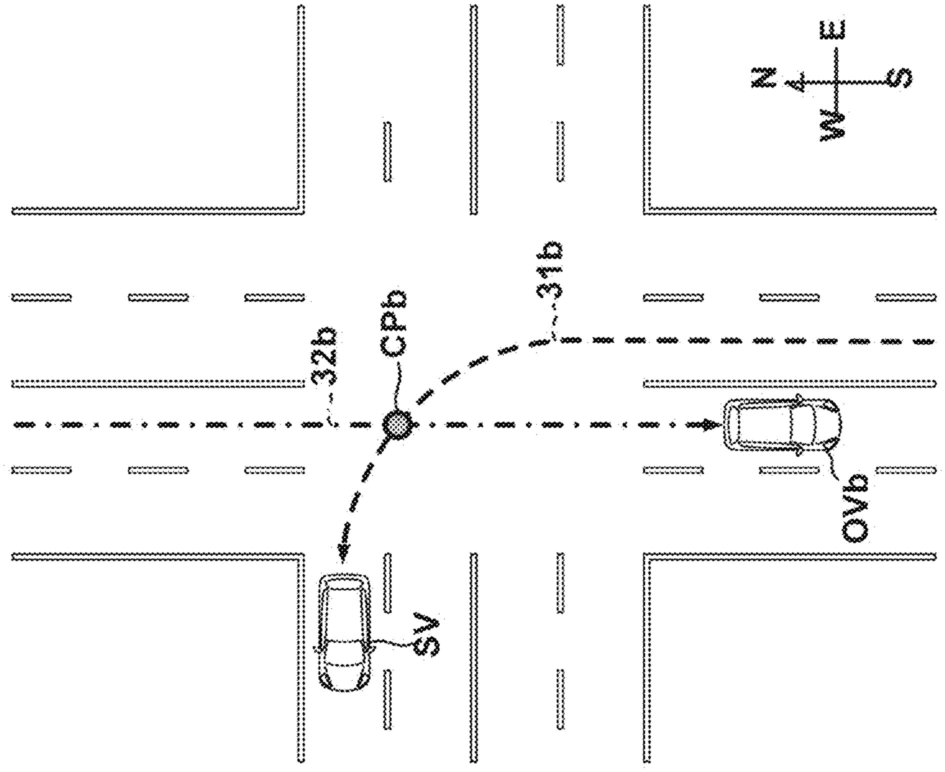
FIGS. 3A and 3B are diagrams for explaining intersection locations.
Figure 3A:
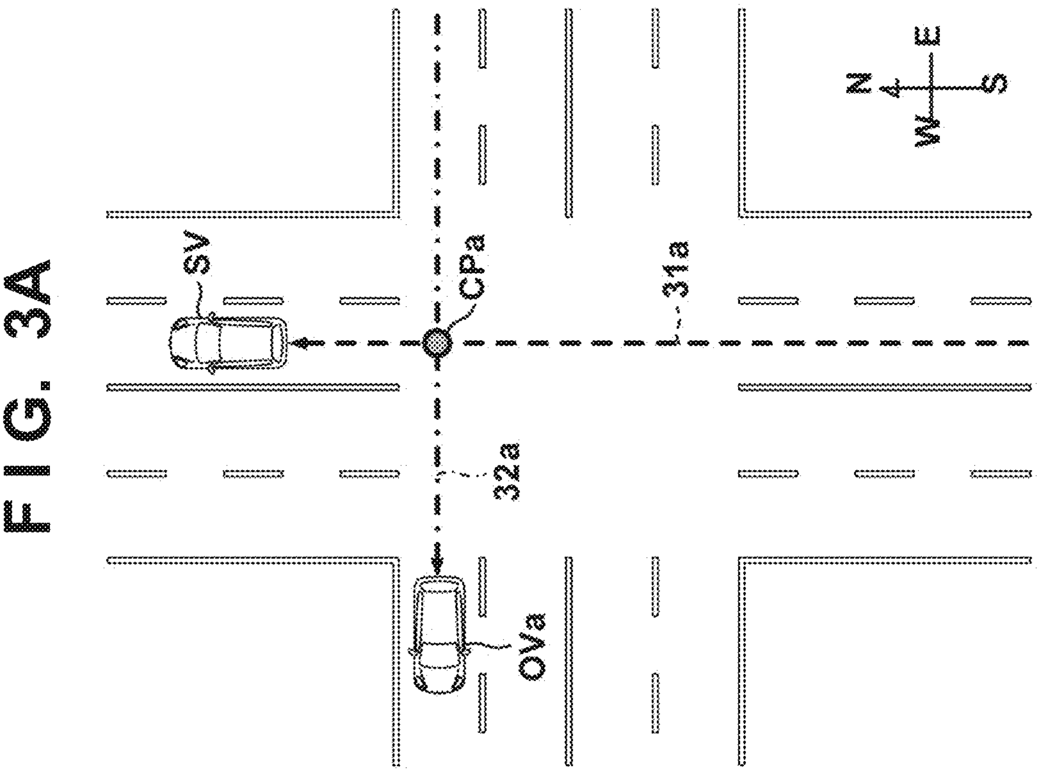

Here, the intersection location will be described with reference to FIGS. 3A and 3B. FIGS. 3A and 3B are diagrams for explaining intersection locations. As described above, the intersection location is a location where the traveling trajectory of the self-vehicle and the traveling trajectory of another vehicle intersected in the past. In the present embodiment, right-side traffic will be described as an example, but the same applies to left-side traffic.

In the example illustrated in FIG. 3A, the location where the traveling trajectory 31*a* of a self-vehicle SV traveling straight in the north direction and the traveling trajectory 32*a* of another vehicle OVa traveling straight in the west direction intersect is specified as an "intersection location CPa" and registered in the intersection location database of the storage unit 22. Since the timing (time) at which the self-vehicle SV passes through the intersection location CPa and the timing (time) at which another vehicle OVa passes through the intersection location CPa are different from each other, no collision occurs between the self-vehicle SV and another vehicle OVa. The traveling trajectory 31*a* of the self-vehicle SV is included in the self-vehicle information acquired by the acquisition unit 21*a* through the sensor group 11 and the GNSS antenna 12 (GNSS module 23). The traveling trajectory 32*a* of another vehicle OVa is included in another vehicle information acquired by the acquisition unit 21*a* through the vehicle-to-vehicle communication antenna 13 (vehicle-to-vehicle communication module 24). Another vehicle information may be understood as surrounding vehicle information since another vehicle OVa is a surrounding vehicle present around the self-vehicle SV at the time of acquisition.

In the example illustrated in FIG. 3B, the location where the traveling trajectory 31*b* of the self-vehicle SV traveling straight in the north direction and turning left and the traveling trajectory 32*b* of another vehicle OVb traveling straight in the south direction intersect is specified as an "intersection location CPb" and registered in the intersection location database of the storage unit 22. Since the timing (time) at which the self-vehicle SV passes through the intersection location CPb and the timing (time) at which another vehicle OVb passes through the intersection location CPb are different from each other, no collision occurs between the self-vehicle SV and another vehicle OVb. Similarly to the traveling trajectory 31*a*, the traveling trajectory 31*b* of the self-vehicle SV is included in the self-vehicle information acquired by the acquisition unit 21*a* through the sensor group 11 and the GNSS antenna 12 (GNSS module 23). Similarly to the traveling trajectory 32*a*, the traveling trajectory 32*b* of another vehicle OVb is included in another vehicle information (surrounding vehicle information) acquired by the acquisition unit 21*a* through the vehicle-to-vehicle communication antenna 13 (vehicle-to-vehicle communication module 24).

In addition, the function of the control device 20 can be implemented by hardware and software. For example, the function of the control device 20 may be implemented by the processing unit 21 (CPU) executing the driving assistance program as described above, or may be implemented by a known semiconductor device such as a PLD (Programmable Logic Device) or an ASIC (Application Specific Integrated Circuit). In the present embodiment, the control device 20 is illustrated as a single element, but may be divided into two or more elements as necessary.

Figure 4:
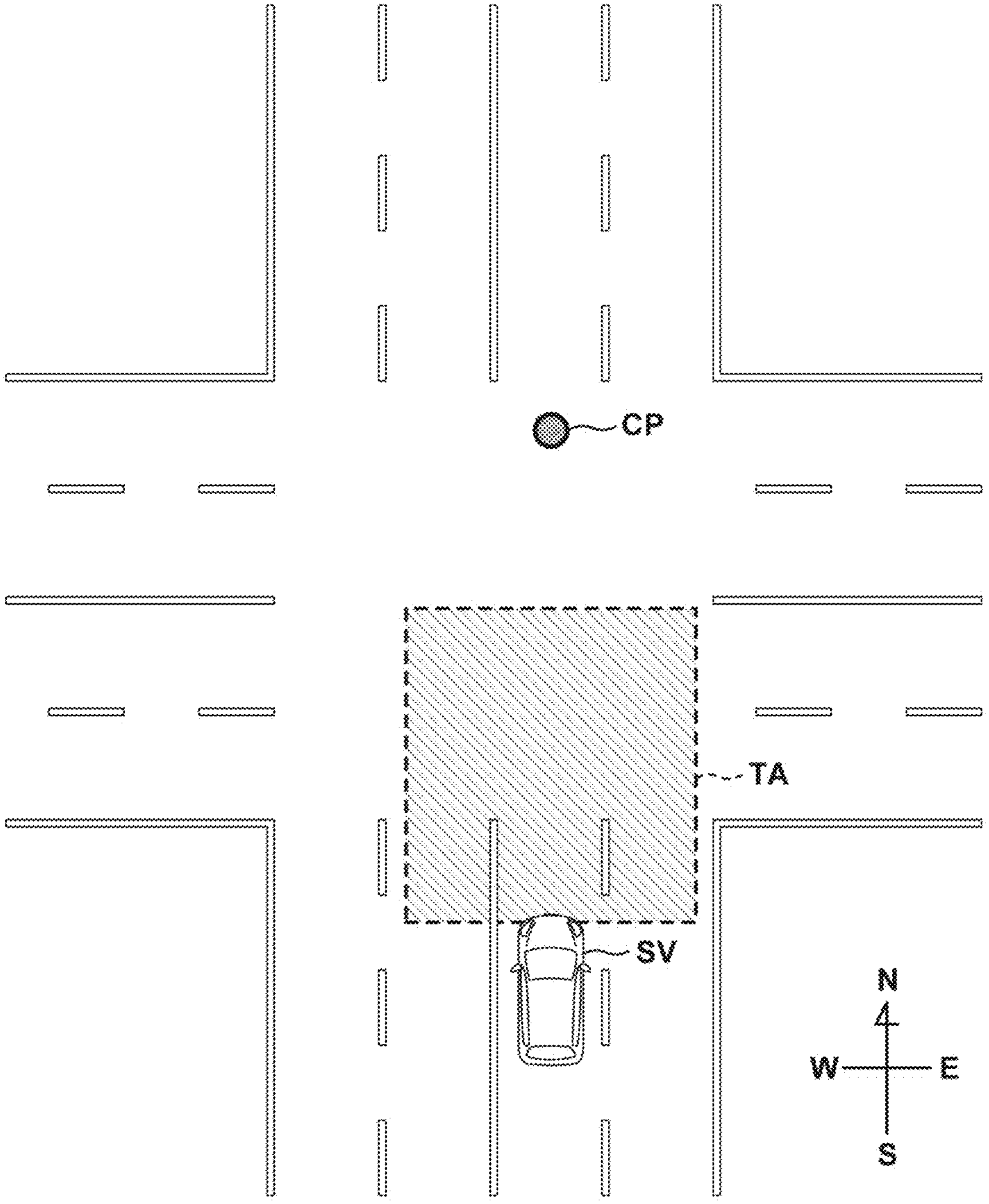
FIG. 4 is a diagram for explaining a problem of a known driving assistance device.

Meanwhile, as described above, the processing unit 21 (prediction unit 21*b*, driving assistance unit 21*c*) in the driving assistance device 100 predicts the possibility of collision of the self-vehicle SV in the target area TA in front of the self-vehicle SV, and performs driving assistance for the self-vehicle SV based on the prediction result. However, for example, when entering a main road including a plurality of lanes, even if there is the registered intersection location CP on the main road as illustrated in FIG. 4, the registered intersection location CP is not included in the target area TA where the driving assistance is performed. For this reason, driving assistance may not be appropriately performed.

Figure 5A:
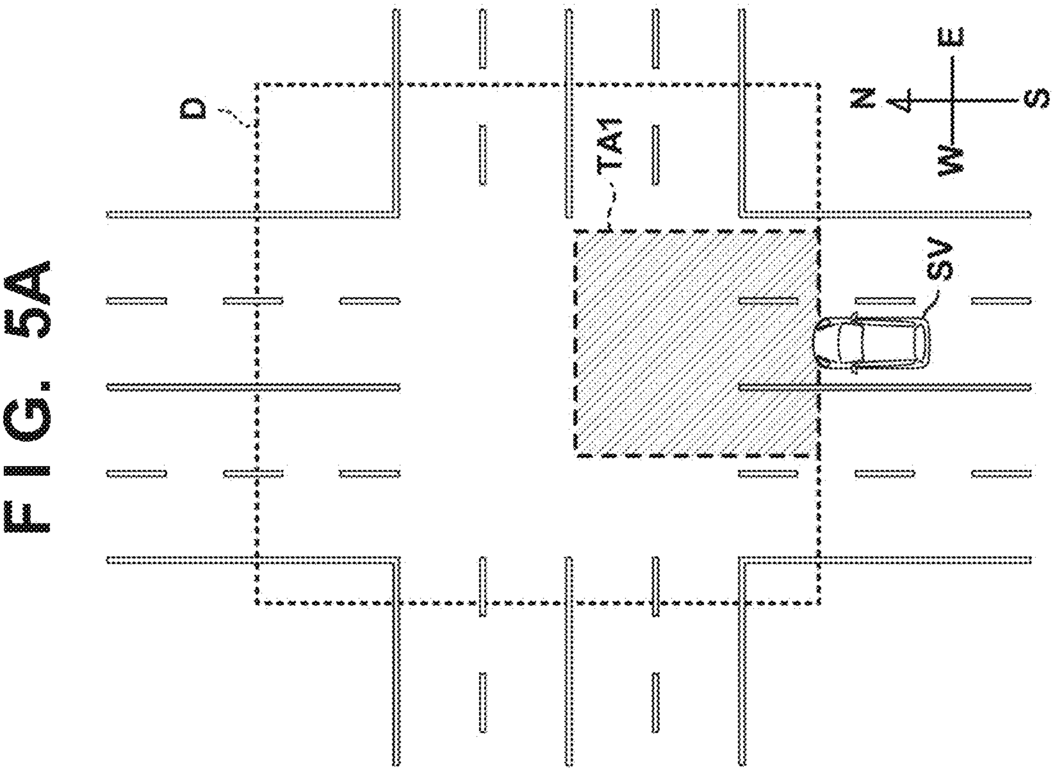
FIGS. 5A and 5B are diagrams for explaining a change in a dimension of a target area where driving assistance for a self-vehicle is performed.
Figure 5B:
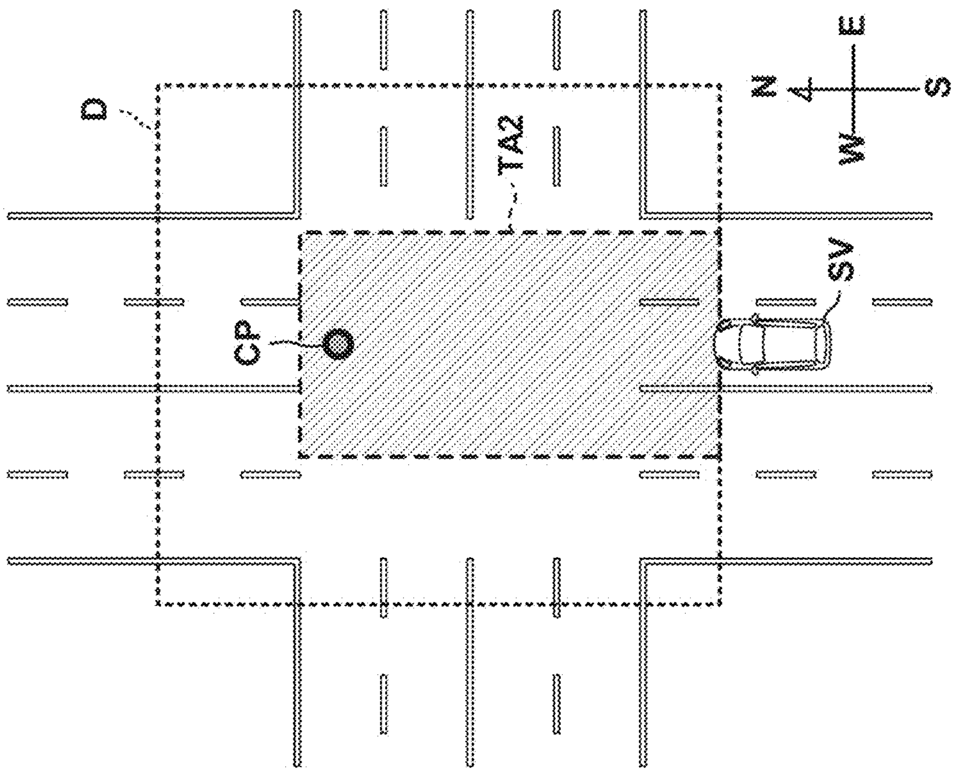

Therefore, as illustrated in FIG. 5A, when none of the plurality of registered intersection locations stored in the storage unit 22 is present within a predetermined distance D in front of the self-vehicle SV, the driving assistance device 100 according to the present embodiment sets the target area TA to a first area TA1 to perform driving assistance for the self-vehicle SV. On the other hand, as illustrated in FIG. 5B, when at least one registered intersection location CP among the plurality of registered intersection locations stored in the storage unit 22 is present within the predetermined distance D in front of the self-vehicle SV, the target area TA is set to a second area TA2 to perform driving assistance for the self-vehicle SV. The second area TA2 is an area larger than the first area TA1, and is set to be longer than the first area TA1 at least in the traveling direction of the self-vehicle SV. The second area TA2 may be set to be longer than the first area TA1 in the vehicle width direction of the self-vehicle SV. In addition, the predetermined distance D may be understood as a predetermined range (search range) for searching for the registered intersection location CP in front of the self-vehicle SV. The predetermined distance D can be arbitrarily set, but can be set to, for example, a distance (range) that can cover the maximum road width assumed for the main road including a plurality of lanes.

Driving Assistance Processing

Figure 6:
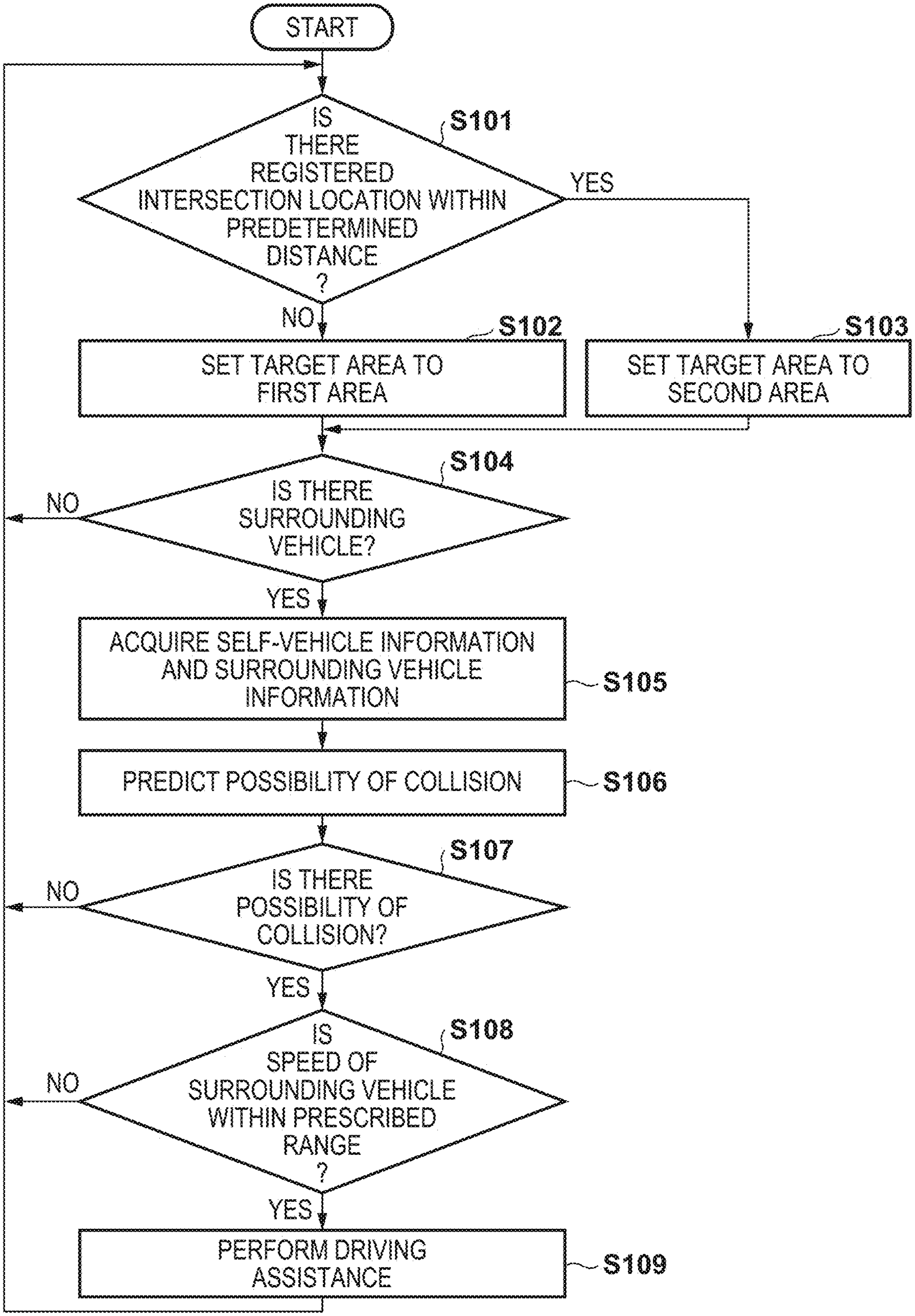
FIG. 6 is a flowchart illustrating driving assistance processing according to an embodiment of the present invention.

Hereinafter, driving assistance processing according to the present embodiment will be described. FIG. 6 is a flowchart illustrating the driving assistance processing according to the present embodiment. The driving assistance processing illustrated in the flowchart of FIG. 6 is performed by the processing unit 21 according to the driving assistance program read from the storage unit 22 in the driving assistance device 100. In addition, the flowchart of FIG. 6 can be repeatedly executed, for example, until the setting of driving assistance is turned off or the ignition of the self-vehicle SV is turned off.

In step S101, the processing unit 21 (prediction unit 21*b*) determines whether or not the registered intersection location CP is present in the predetermined area D in front of the self-vehicle SV by referring to the plurality of registered intersection locations CP stored in the storage unit 22. For example, the processing unit 21 can determine whether or not the registered intersection location CP is present in the predetermined area D in front of the self-vehicle SV by comparing the current location of the self-vehicle SV acquired by the acquisition unit 21*a* through the GNSS antenna 12 (GNSS module 23) with the coordinates (latitude, longitude) of each registered intersection location CP stored in the storage unit 22. When the registered intersection location CP is not present in the predetermined area D, the process proceeds to step S102, and the processing unit 21 (prediction unit 21*b*) sets the target area TA in which driving assistance is performed in front of the self-vehicle SV to the first area TA1. On the other hand, when the registered intersection location CP is present in the predetermined area D, the process proceeds to step S103 in which the processing unit 21 (prediction unit 21*b*) sets the target area TA to the second area TA2. That is, the processing unit 21 changes the target area TA from the first area TA1 to the second area TA2.

In step S104, the processing unit 21 determines whether or not there is a surrounding vehicle RV. As described above, the surrounding vehicle RV is a vehicle currently present around the self-vehicle SV. For example, the processing unit 21 can determine that the surrounding vehicle RV is present when vehicle-to-vehicle communication can be performed through the vehicle-to-vehicle communication antenna 13 (vehicle-to-vehicle communication module 24). When it is determined that there is no surrounding vehicle RV, the process proceeds to step S101, and when it is determined that there is a surrounding vehicle RV, the process proceeds to step S105.

In step S105, the processing unit 21 (acquisition unit 21*a*) acquires self-vehicle information and surrounding vehicle information. For example, the processing unit 21 acquires surrounding vehicle information including the current location, speed, and traveling trajectory of the surrounding vehicle RV from the surrounding vehicle RV through the vehicle-to-vehicle communication antenna 13 (vehicle-to-vehicle communication module 24). In addition, the processing unit 21 acquires self-vehicle information including the current location, speed, and traveling trajectory of the self-vehicle SV through the sensor group 11 and the GNSS antenna 12 (GNSS module 23).

In step S106, the processing unit 21 (prediction unit 21*b*) predicts the possibility of collision between the self-vehicle SV and the surrounding vehicle RV in the target area TA based on the self-vehicle information and the surrounding vehicle information acquired in step S105. The target area TA in which the possibility of collision between the self-vehicle SV and the surrounding vehicle RV is predicted is set in the first area TA1 in step S102 or in the second area TA2 in step S103. Details of the prediction of the possibility of collision in the target area TA will be described later.

In step S107, the processing unit 21 (driving assistance unit 21*c*) determines whether or not there is a possibility of collision between the self-vehicle SV and the surrounding vehicle RV based on the prediction result in step S106. When it is determined that there is no possibility of collision, the process proceeds to step S101, and when it is determined that there is a possibility of collision, the process proceeds to step S108.

In step S108, the processing unit 21 (driving assistance unit 21*c*) determines whether or not the speed of the surrounding vehicle RV is within a prescribed range based on the surrounding vehicle information acquired in step S105. The prescribed range can be set in advance using the speed lower limit value and the speed upper limit value related to the speed of the surrounding vehicle RV. When the speed of the surrounding vehicle RV is equal to or less than the speed lower limit value of the prescribed range, there is a high possibility that the driver of the surrounding vehicle RV notices the self-vehicle SV and decelerates the surrounding vehicle RV without colliding with the self-vehicle SV. That is, the speed lower limit value of the prescribed range related to the speed of the surrounding vehicle RV can be set to a value that allows the surrounding vehicle RV to be decelerated without colliding with the self-vehicle SV. In addition, when the speed of the surrounding vehicle RV is equal to or greater than the upper limit value of the prescribed range, there is a high possibility that the surrounding vehicle RV is not a vehicle traveling on the road the self-vehicle SV enters, such as traveling on an expressway in the vicinity of the road the self-vehicle SV enters. That is, the upper limit value of the prescribed range related to the speed of the surrounding vehicle RV can be set to a value that enables determination of whether or not the vehicle is traveling on the road the self-vehicle SV enters or traveling on an expressway in the vicinity of the road. In this manner, by performing/suppressing the driving assistance according to whether or not the speed of the surrounding vehicle RV is within the prescribed range, it is possible to reduce the driver of the self-vehicle SV from feeling annoyance of the driving assistance.

When it is determined in step S108 that the speed of the surrounding vehicle RV is not within the prescribed range, that is, outside the prescribed range, the process proceeds to step S101. That is, in the case of the present embodiment, regardless of the possibility of collision predicted in steps S106 and S107, the processing unit 21 does not provide driving assistance for the self-vehicle SV when the speed of the surrounding vehicle RV is outside the prescribed range. On the other hand, when it is determined that the speed of the surrounding vehicle RV is within the prescribed range, the process proceeds to step S109, and the processing unit 21 (driving assistance unit 21*c*) performs driving assistance for the self-vehicle SV. As driving assistance for the self-vehicle SV, the processing unit 21 can notify an occupant of the self-vehicle SV of the possibility of collision through the notification device 14 or perform a braking operation on the self-vehicle SV using the braking device 15.

Method of Predicting Possibility of Collision

Next, a method of predicting the possibility of collision of the self-vehicle SV in step S106 will be described. As the method of predicting the possibility of collision, the following Examples 1 to 3 can be mentioned. The processing unit 21 can predict the possibility of collision of the self-vehicle SV using the prediction method of the embodiment selected according to the situation or setting among Examples 1 to 3.

Example 1

Figure 7:
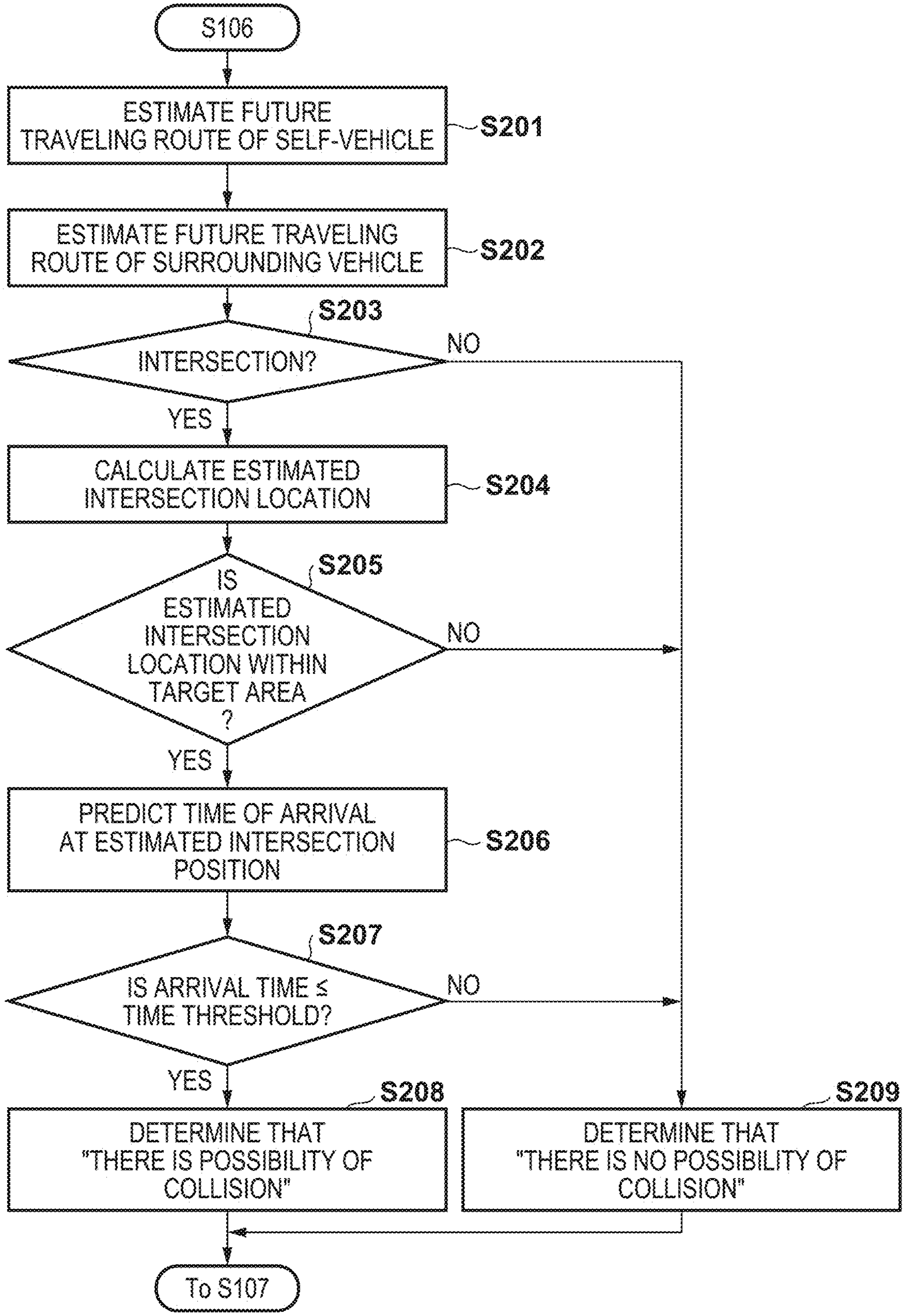
FIG. 7 is a flowchart illustrating a method of predicting the possibility of collision of a self-vehicle (Example 1)
Figure 8:
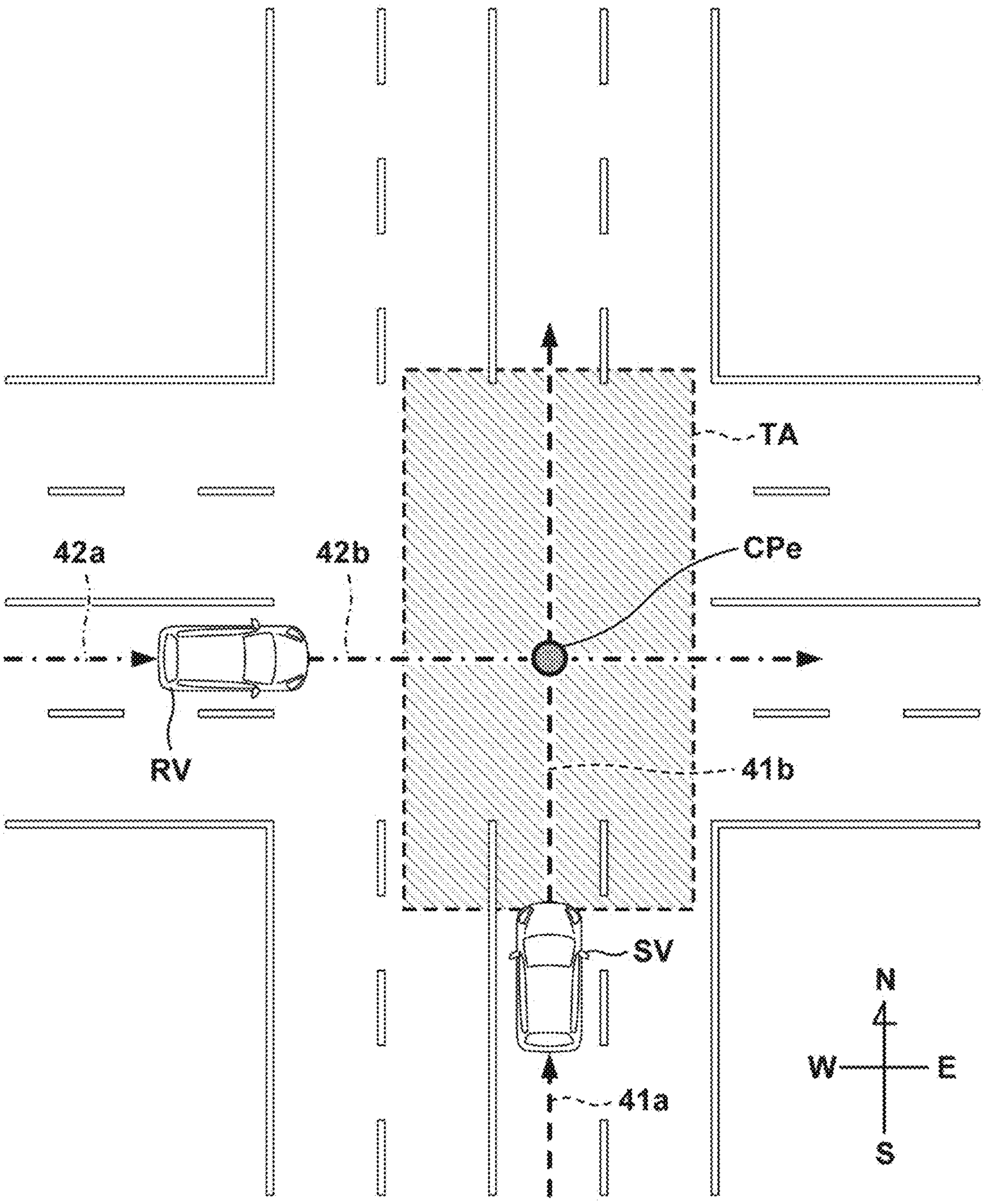
FIG. 8 is a diagram for explaining a method of predicting the possibility of collision in Example 1.

Hereinafter, Example 1 related to the method of predicting the possibility of collision of the self-vehicle SV will be described. In Example 1, an example of predicting the possibility of collision of the self-vehicle SV using the time to collision (TTC) will be described. FIG. 7 is a flowchart illustrating the method of predicting the possibility of collision of the self-vehicle SV in step S106 (Example 1). The flowchart of FIG. 7 can be executed by the processing unit 21 (prediction unit 21*b*). In addition, FIG. 8 is a diagram for explaining the method of predicting the possibility of collision in Example 1.

In step S201, the processing unit 21 estimates a route (future traveling route) on which the self-vehicle SV will travel in the future based on the self-vehicle information acquired in step S105. For example, as illustrated in FIG. 8, the processing unit 21 can estimate a future traveling route 41*b* of the self-vehicle SV by extending the traveling trajectory 41*a* along the past traveling trajectory 41*a* of the self-vehicle SV included in the self-vehicle information.

In step S202, the processing unit 21 estimates a route (future traveling route) on which the surrounding vehicle RV travels in the future based on the surrounding vehicle information acquired in step S105. For example, as illustrated in FIG. 8, the processing unit 21 can estimate a future traveling route 42*b* of the surrounding vehicle RV by extending the traveling trajectory 42*a* along the past traveling trajectory 42*a* of the surrounding vehicle RV included in the surrounding vehicle information.

In step S203, the processing unit 21 determines whether or not the future traveling route 41*b* of the self-vehicle SV estimated in step S201 and the future traveling route 42*b* of the surrounding vehicle RV estimated in step S202 intersect. When it is determined that the future traveling route 41*b* of the self-vehicle SV and the future traveling route 42*b* of the surrounding vehicle RV do not intersect, the process proceeds to step S209 in which the processing unit 21 determines that there is no possibility of collision between the self-vehicle SV and the surrounding vehicle RV, and then proceeds to step S107 of the flowchart of FIG. 6. On the other hand, when it is determined that the future traveling route 41*b* of the self-vehicle SV and the future traveling route 42*b* of the surrounding vehicle RV intersect, the process proceeds to step S204.

In step S204, the processing unit 21 calculates, as an estimated intersection location CPe, a location where the future traveling route 41*b* of the self-vehicle SV estimated in step S201 and the future traveling route 42*b* of the surrounding vehicle RV estimated in step S202 intersect. The estimated intersection location CPe is a location through which both the self-vehicle SV and the surrounding vehicle RV pass. When the estimated intersection location CPe is within the target area TA, it can be determined that there is a possibility that the self-vehicle SV and the surrounding vehicle RV will collide at the estimated intersection location CPe. As described above, the target area TA is an area (driving assistance area) to be subjected to driving assistance for preventing collision between the self-vehicle SV and the surrounding vehicle RV, and is set to the first area TA1 in step S102 or the second area TA2 in step S103 of the flowchart of FIG. 6.

In step S205, the processing unit 21 determines whether or not the estimated intersection location CPe obtained in step S204 is within the target area TA. When it is determined that the estimated intersection location CPe is not within the target area TA, the process proceeds to step S209 in which the processing unit 21 determines that there is no possibility of collision between the self-vehicle SV and the surrounding vehicle RV, and then proceeds to step S107 of the flowchart of FIG. 6. On the other hand, when it is determined that the estimated intersection location CPe is within the target area TA, the process proceeds to step S206. In addition, FIG. 8 illustrates an example in which the estimated intersection location CPe is within the target area TA.

In step S206, the processing unit 21 predicts the time until the surrounding vehicle RV will arrive at the estimated intersection location CPe, as a possibility of collision, based on the surrounding vehicle information acquired in step S105. For example, the processing unit 21 can predict the time of arrival of the surrounding vehicle RV at the estimated intersection location CPe (hereinafter, may be simply referred to as "arrival time") by dividing the distance between the surrounding vehicle RV and the estimated intersection location CPe by the speed of the surrounding vehicle RV based on the current location and the speed of the surrounding vehicle RV included in the surrounding vehicle information.

In step S207, the processing unit 21 determines whether or not the arrival time obtained in step S206 is equal to or less than a time threshold value. The time threshold value can be set by an occupant of the self-vehicle SV. When the arrival time is equal to or less than the time threshold value, the process proceeds to step S208 in which the processing unit 21 determines that there is a possibility of collision between the self-vehicle SV and the surrounding vehicle RV, and then proceeds to step S107 of the flowchart of FIG. 6. On the other hand, when the arrival time is larger than the time threshold value, the process proceeds to step S209 in which the processing unit 21 determines that there is no possibility of collision between the self-vehicle SV and the surrounding vehicle RV, and then proceeds to step S107 of the flowchart of FIG. 6.

Figure 9:
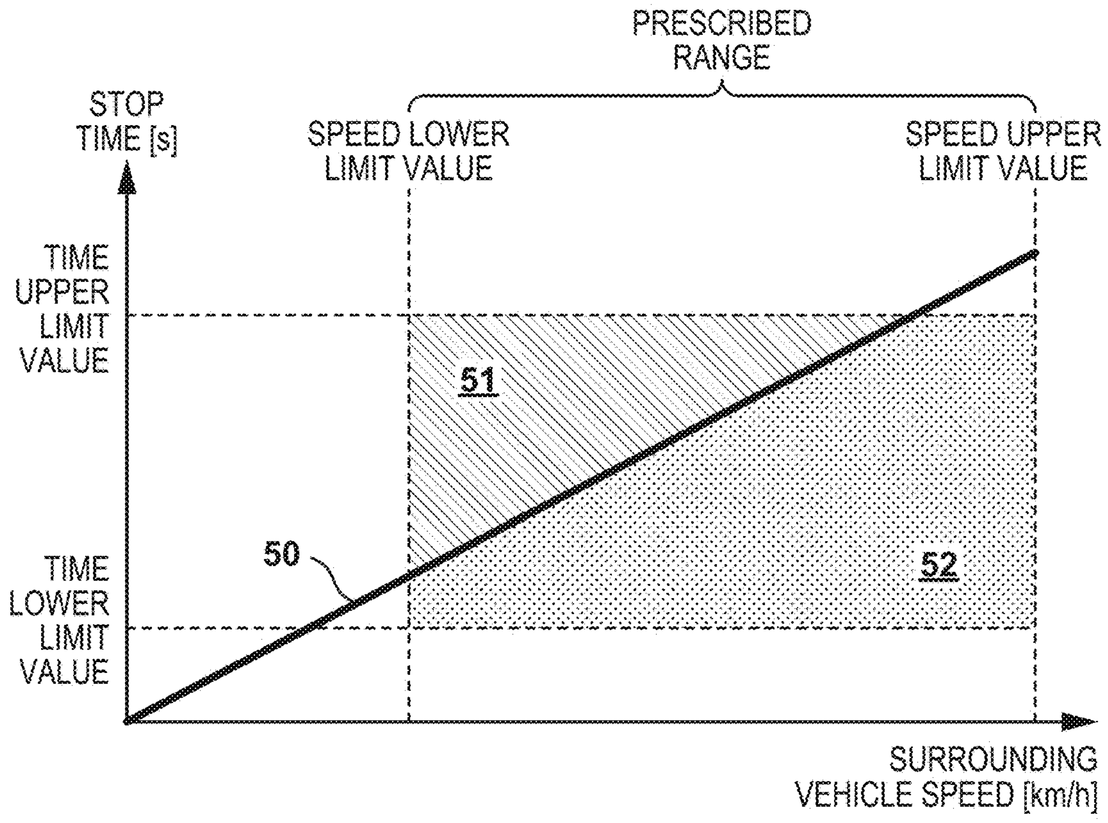
FIG. 9 is a diagram illustrating a relationship between the speed and the stop time of a surrounding vehicle.

Here, the processing unit 21 may change the time threshold value according to the speed of the surrounding vehicle RV included in the surrounding vehicle information. FIG. 9 is a diagram illustrating a relationship between the speed of the surrounding vehicle RV and stop time of the surrounding vehicle RV. The stop time of the surrounding vehicle RV is a time until the surrounding vehicle RV stops at deceleration (for example, 0.4 G) by a typical braking operation. FIG. 9 illustrates a prescribed range (speed upper limit value and speed lower limit value) related to the speed of the surrounding vehicle RV and a time upper limit value and a time lower limit value related to time to collision (TTC). As described above in step S108, the prescribed range is the speed range of the surrounding vehicle RV in which driving assistance for the self-vehicle SV is performed. The time upper limit value is an upper limit value of the time to collision arbitrarily set by the driver or the like, and the time lower limit value is a lower limit value of the time to collision set from the measurement location accuracy of the GNSS.

The processing unit 21 sets the stop time corresponding to the speed of the surrounding vehicle RV as a time threshold value based on the "relationship between the speed of the surrounding vehicle RV and the stop time" indicated by a line 50 in FIG. 9. In the area 51 above the line 50, the arrival time is longer than the stop time. Therefore, if the driver of the surrounding vehicle RV performs a typical braking operation (for example, deceleration 0.4 G), the surrounding vehicle RV can be stopped before the surrounding vehicle RV reaches the estimated intersection location CPe. Therefore, when the arrival time is larger than the time threshold value (stop time), driving assistance for the self-vehicle SV can be suppressed. On the other hand, in the area 52 below the line 50, the arrival time is shorter than the stop time. Therefore, even if the driver of the surrounding vehicle RV performs a typical braking operation (for example, deceleration 0.4 G), the vehicle can reach the estimated intersection location CPe before the surrounding vehicle RV stops. Therefore, when the arrival time is equal to or less than the time threshold value (stop time), driving assistance for the self-vehicle SV can be performed. In addition, the processing unit 21 may change the time threshold value continuously or stepwise according to the speed of the surrounding vehicle RV.

Example 2

Figure 10:
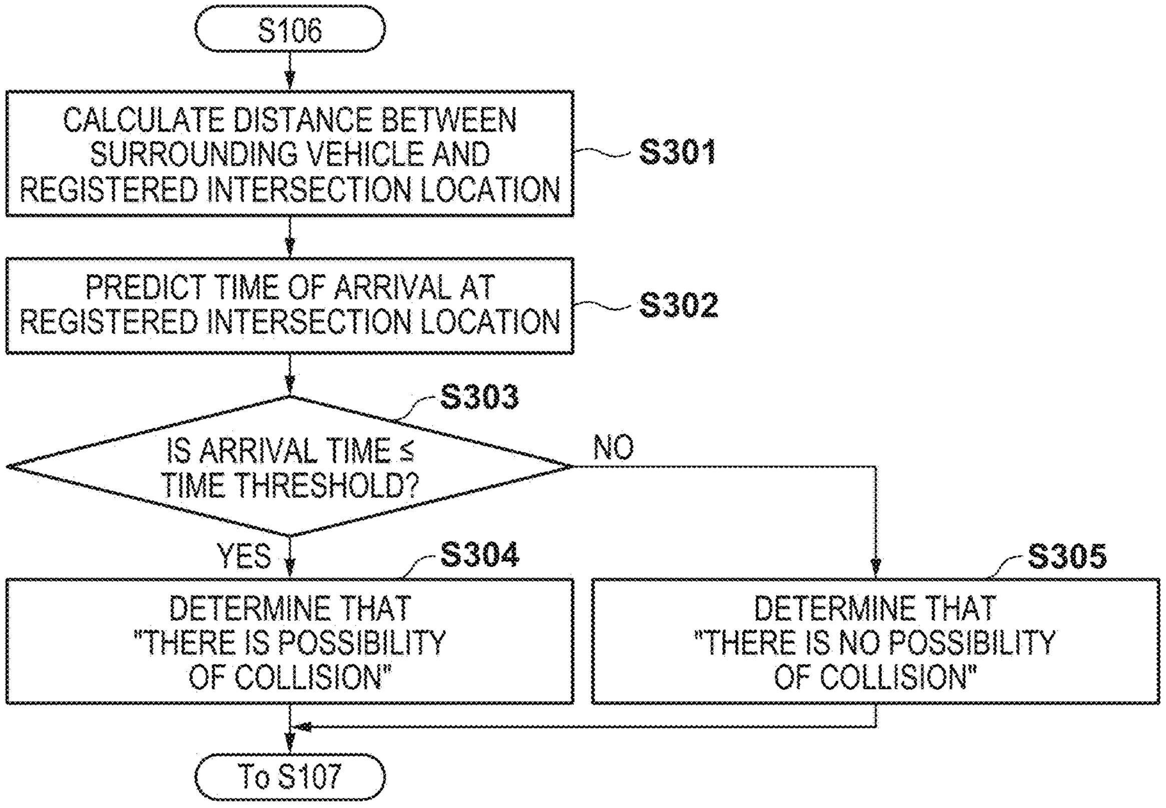
FIG. 10 is a flowchart illustrating a method of predicting the possibility of collision of a self-vehicle (Example 2)
Figure 11:
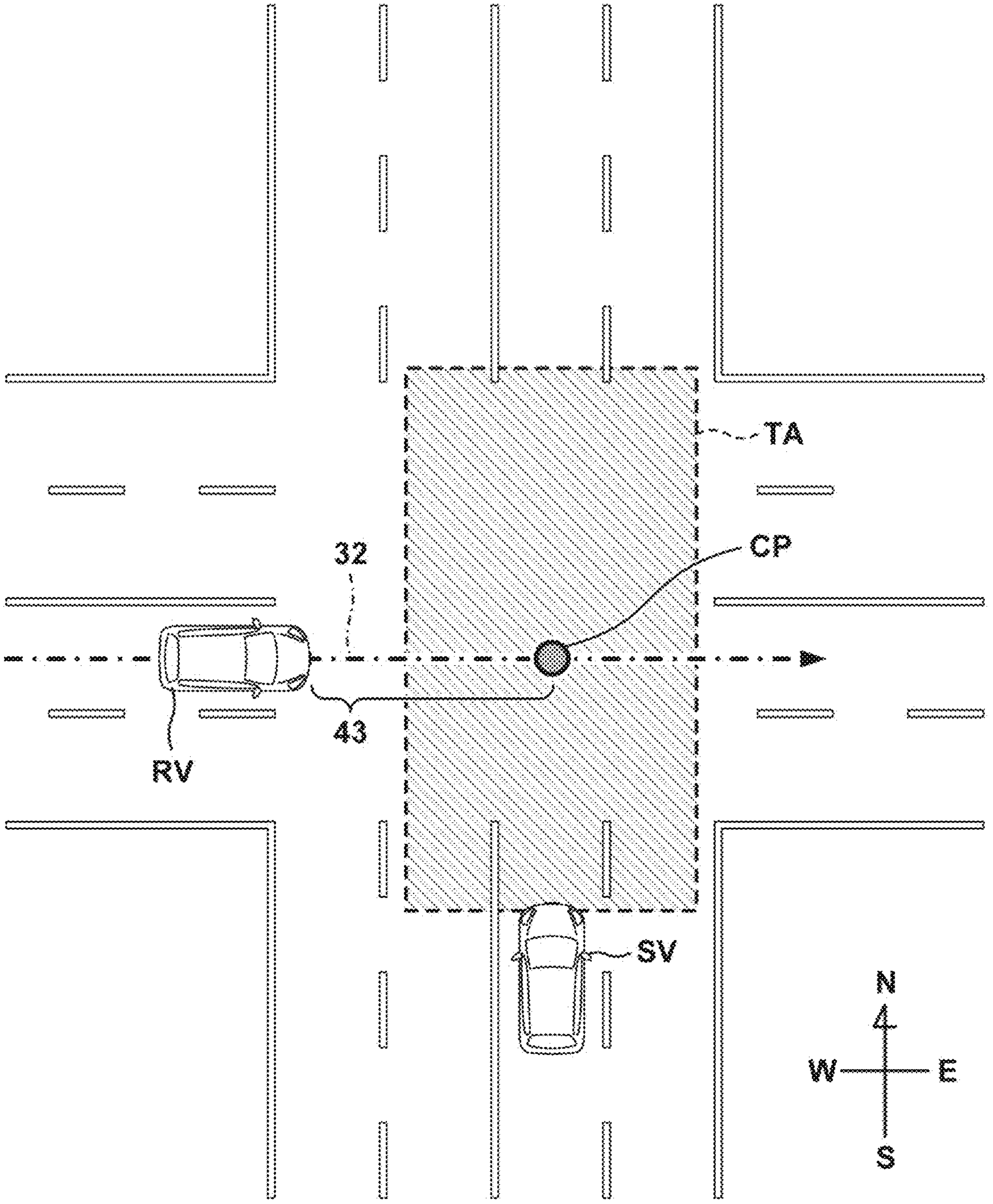
FIG. 11 is a diagram for explaining a method of predicting the possibility of collision in Example 2.

Hereinafter, Example 2 related to the method of predicting the possibility of collision of the self-vehicle SV will be described. In Example 2, as in Example 1, an example of predicting the possibility of collision of the self-vehicle SV using the time to collision (TTC) will be described. However, in Example 2, when at least one registered intersection location CP is present in the target area TA, the possibility of collision is predicted using information related to the registered intersection location CP. In the method of Example 2, the possibility of collision can be predicted by a simple process as compared with the method of Example 1. FIG. 10 is a flowchart illustrating a method (Example 2) of predicting the possibility of collision of the self-vehicle SV in step S106. The flowchart of FIG. 10 can be executed by the processing unit 21 (prediction unit 21*b*). In addition, FIG. 11 is a diagram for explaining a method of predicting the possibility of collision in Example 2. Hereinafter, an example in which only one registered intersection location CP is present within the predetermined distance D will be described.

Here, the method of Example 2 is based on the conditions in which at least one registered intersection location CP is present within the predetermined distance D and the target area TA is set to the second area TA2 through step S103. In addition, the method of Example 2 is based on the conditions in which the surrounding vehicle RV is present (is located) on the traveling trajectory of another vehicle OV used when the registered intersection location CP in the target area TA (second area TA2) is registered in the intersection location database of the storage unit 22. Since the traveling trajectory of another vehicle OV is stored in the storage unit 22 in association with the registered intersection location CP, the processing unit 21 can determine whether or not the surrounding vehicle RV is present on the traveling trajectory of another vehicle OV based on the traveling trajectory of another vehicle OV and the surrounding vehicle information (current location of the surrounding vehicle RV). When these conditions are not satisfied, the processing unit 21 can predict the possibility of collision using another prediction method such as the above-described Example 1.

In step S301, the processing unit 21 calculates a distance 43 between the surrounding vehicle RV and the registered intersection location based on the surrounding vehicle information acquired in step S105 and the registered intersection location CP in the target area TA (second area TA2). For example, the storage unit 22 stores the traveling trajectory 32 of another vehicle OV, which is used when registering the registered intersection location CP, in association with the registered intersection location CP. Based on the traveling trajectory 32 of another vehicle OV stored in association with the registered intersection location CP, the processing unit 21 can calculate the distance 43 between the surrounding vehicle RV and the registered intersection location CP on the traveling trajectory 32.

In step S302, the processing unit 21 predicts the time until the surrounding vehicle RV will arrive at the registered intersection location CP, as a possibility of collision, based on the distance 43 obtained in step S301 and the surrounding vehicle information obtained in step S105. For example, the processing unit 21 can predict the time of arrival of the surrounding vehicle RV at the registered intersection location CP (hereinafter, may be simply referred to as "arrival time") by dividing the distance 43 by the speed of the surrounding vehicle RV included in the surrounding vehicle information.

In step S303, the processing unit 21 determines whether or not the arrival time obtained in step S302 is equal to or less than the time threshold value. When the arrival time is equal to or less than the time threshold value, the process proceeds to step S304 in which the processing unit 21 determines that there is a possibility of collision between the self-vehicle SV and the surrounding vehicle RV, and then proceeds to step S107 of the flowchart of FIG. 6. On the other hand, when the arrival time is larger than the time threshold value, the process proceeds to step S305 in which the processing unit 21 determines that there is no possibility of collision between the self-vehicle SV and the surrounding vehicle RV, and then proceeds to step S107 of the flowchart of FIG. 6. Here, the time threshold value can be set by an occupant of the self-vehicle SV. In addition, as in Example 1, the processing unit 21 may change the time threshold value according to the speed of the surrounding vehicle RV included in the surrounding vehicle information.

Example 3

Figure 12:
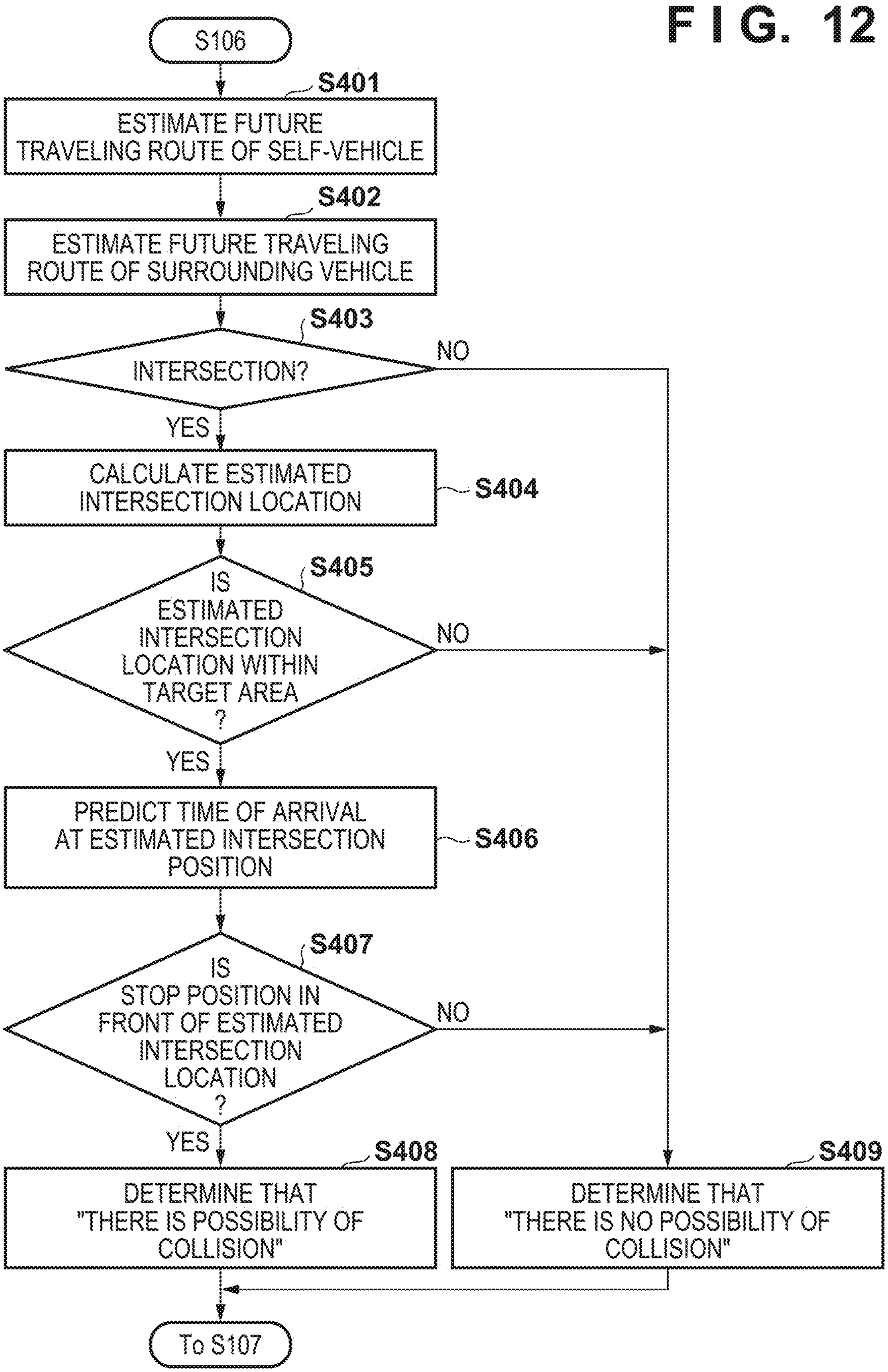
FIG. 12 is a flowchart illustrating a method of predicting the possibility of collision of a self-vehicle (Example 3)
Figure 13:
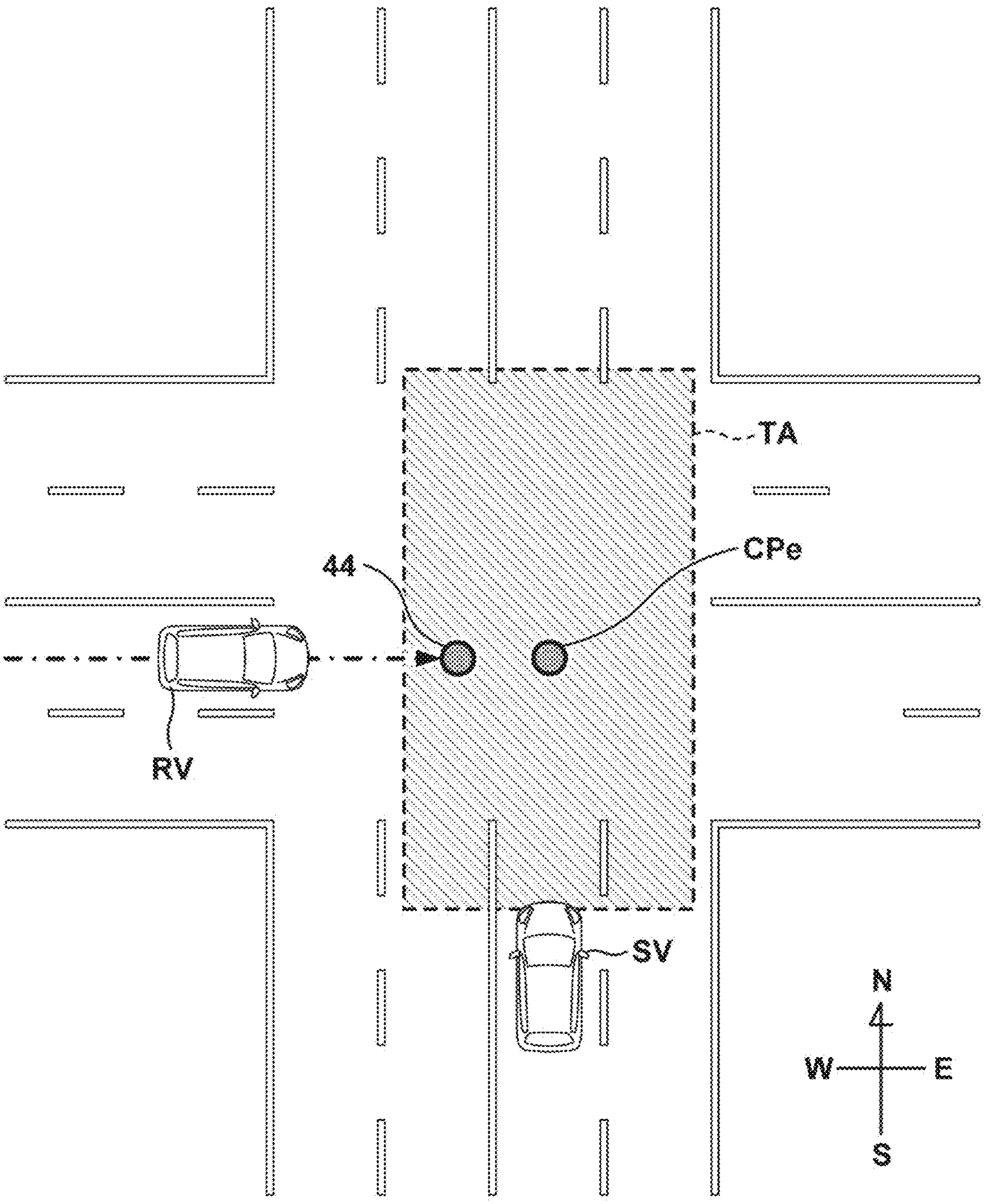
FIG. 13 is a diagram for explaining a method of predicting the possibility of collision in Example 3.

Hereinafter, Example 3 related to the method of predicting the possibility of collision of the self-vehicle SV will be described. In Example 3, an example of predicting the possibility of collision of the self-vehicle SV using the stop location of the surrounding vehicle RV will be described. FIG. 12 is a flowchart illustrating the method (Example 3) of predicting the possibility of collision of the self-vehicle SV in step S106. The flowchart of FIG. 12 can be executed by the processing unit 21 (prediction unit 21*b*). In addition, FIG. 13 is a diagram for explaining the method of predicting the possibility of collision in Example 3.

In step S401, the processing unit 21 estimates a route (future traveling route) on which the self-vehicle SV will travel in the future based on the self-vehicle information acquired in step S105. Then, in step S402, the processing unit 21 estimates a route (future traveling route) on which the surrounding vehicle RV travels in the future based on the surrounding vehicle information acquired in step S105.

Since steps S401 and S402 are steps similar to steps S201 and S202 in the flowchart of FIG. 7, detailed description thereof will be omitted herein.

In step S403, the processing unit 21 determines whether or not the future traveling route of the self-vehicle SV estimated in step S401 intersects with the future traveling route of the surrounding vehicle RV estimated in step S402. When it is determined that the future traveling route of the self-vehicle SV and the future traveling route of the surrounding vehicle RV do not intersect, the process proceeds to step S409 in which the processing unit 21 determines that there is no possibility of collision between the self-vehicle SV and the surrounding vehicle RV, and then proceeds to step S107 of the flowchart of FIG. 6. On the other hand, when it is determined that the future traveling route of the self-vehicle SV and the future traveling route of the surrounding vehicle RV intersect, the process proceeds to step S404. Since step S403 is a step similar to step S203 in the flowchart of FIG. 7, detailed description thereof will be omitted herein.

In step S404, the processing unit 21 calculates, as an estimated intersection location CPe, a location where the future traveling route of the self-vehicle SV estimated in step S401 and the future traveling route of the surrounding vehicle RV estimated in step S402 intersect. Then, in step S405, the processing unit 21 determines whether or not the estimated intersection location CPe obtained in step S404 is within the target area TA. When it is determined that the estimated intersection location CPe is not within the target area TA, the process proceeds to step S409 in which the processing unit 21 determines that there is no possibility of collision between the self-vehicle SV and the surrounding vehicle RV, and then proceeds to step S107 of the flowchart of FIG. 6. On the other hand, when it is determined that the estimated intersection location CPe is within the target area TA, the process proceeds to step S406. Since steps S404 and S405 are steps similar to steps S204 and S205 in the flowchart of FIG. 7, detailed description thereof will be omitted herein.

In step S406, the processing unit 21 predicts, as the possibility of collision, a stop location 44 when the surrounding vehicle RV decelerates from the current location at a predetermined deceleration based on the surrounding vehicle information acquired in step S105. As the predetermined deceleration, deceleration (for example, 0.4 G) by a typical braking operation can be used. For example, the processing unit 21 can predict the stop location 44 of the surrounding vehicle RV (hereinafter, may be simply referred to as a "stop location 44") as illustrated in FIG. 13 by calculating a distance until the surrounding vehicle RV decelerates at a predetermined deceleration from the current speed to stop, based on the current location and speed of the surrounding vehicle RV included in the surrounding vehicle information, and adding the distance to the current location of the surrounding vehicle RV.

In step S407, the processing unit 21 determines whether or not the stop location 44 is ahead of the estimated intersection location CPe in the traveling direction of the surrounding vehicle RV. When the stop location 44 is ahead of the estimated intersection location CPe in the traveling direction of the surrounding vehicle RV, the process proceeds to step S408 in which the processing unit 21 determines that there is a possibility of collision between the self-vehicle SV and the surrounding vehicle RV, and then proceeds to step S107 of the flowchart of FIG. 6. On the other hand, when the stop location 44 is not ahead of the estimated intersection location CPe in the traveling direction of the surrounding vehicle RV, that is, when the stop location 44 is behind the estimated intersection location CPe in the traveling direction of the surrounding vehicle RV (ahead in the traveling direction), the process proceeds to step S409 in which the processing unit 21 determines that there is no possibility of collision between the self-vehicle SV and the surrounding vehicle RV, and then proceeds to step S107 of the flowchart of FIG. 6. FIG. 13 illustrates an example in which the stop location 44 is behind the estimated intersection location CPe in the traveling direction of the surrounding vehicle RV.

Registration of New Intersection Location

Figure 14:
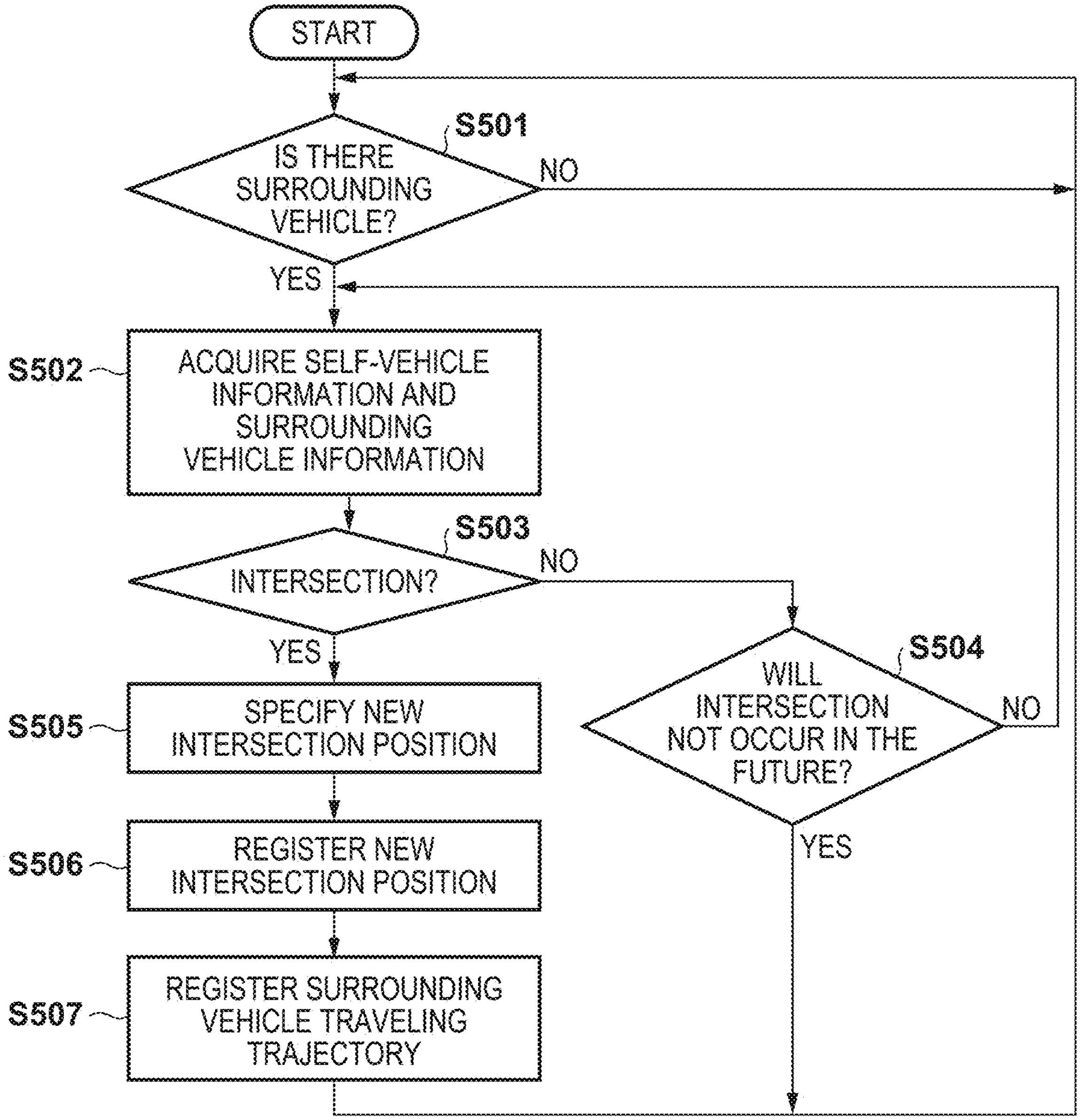
FIG. 14 is a flowchart illustrating a method of registering a new intersection location.

Next, a method of registering a new intersection location in the intersection location database of the storage unit 22 will be described. The new intersection location is a location where the self-vehicle SV and the surrounding vehicle RV intersect with each other, is specified by the specifying unit 21*d* of the processing unit 21, and is registered in the intersection location database of the storage unit 22 by the registration unit 21*e*. FIG. 14 is a flowchart illustrating a method of registering a new intersection location. The flowchart of FIG. 14 may be executed by the processing unit 21 in parallel with the flowchart of FIG. 6. In addition, the flowchart of FIG. 14 can be repeatedly executed, for example, until the setting of driving assistance is turned off or the ignition of the self-vehicle SV is turned off.

In step S501, the processing unit 21 determines whether or not there is a surrounding vehicle RV. When it is determined that there is no surrounding vehicle RV, step S501 is repeated, and when it is determined that there is a surrounding vehicle RV, the process proceeds to step S502. Since step S501 is a step similar to step S104 in the flowchart of FIG. 6, detailed description thereof will be omitted herein. Step S501 may be performed together with step S104 in the flowchart of FIG. 6. That is, in this step S501, the determination result in step S104 of the flowchart of FIG. 6 may be used.

In step S502, the processing unit 21 (acquisition unit 21*a*) acquires self-vehicle information and surrounding vehicle information. Since step S502 is a step similar to step S105 in the flowchart of FIG. 6, detailed description thereof will be omitted herein. In step S502, the self-vehicle information and the surrounding vehicle information obtained in step S105 of the flowchart of FIG. 6 may be used.

In step S503, the processing unit 21 (specifying unit 21*d*) determines whether or not the self-vehicle SV and the surrounding vehicle RV intersect based on the self-vehicle information and the surrounding vehicle information acquired in step S502. The intersection between the self-vehicle SV and the surrounding vehicle RV means that the self-vehicle SV and the surrounding vehicle RV pass through the same location at different timings, and no collision occurs between the self-vehicle SV and another vehicle OVa. For example, the processing unit 21 can determine whether or not the self-vehicle SV and the surrounding vehicle RV intersect based on the traveling trajectory of the self-vehicle SV included in the self-vehicle information and the traveling trajectory of the surrounding vehicle RV included in the surrounding vehicle information. When it is determined that the self-vehicle SV and the surrounding vehicle RV do not intersect yet, the process proceeds to step S504, and when it is determined that the self-vehicle SV and the surrounding vehicle RV intersect, the process proceeds to step S505.

Figure 15B:
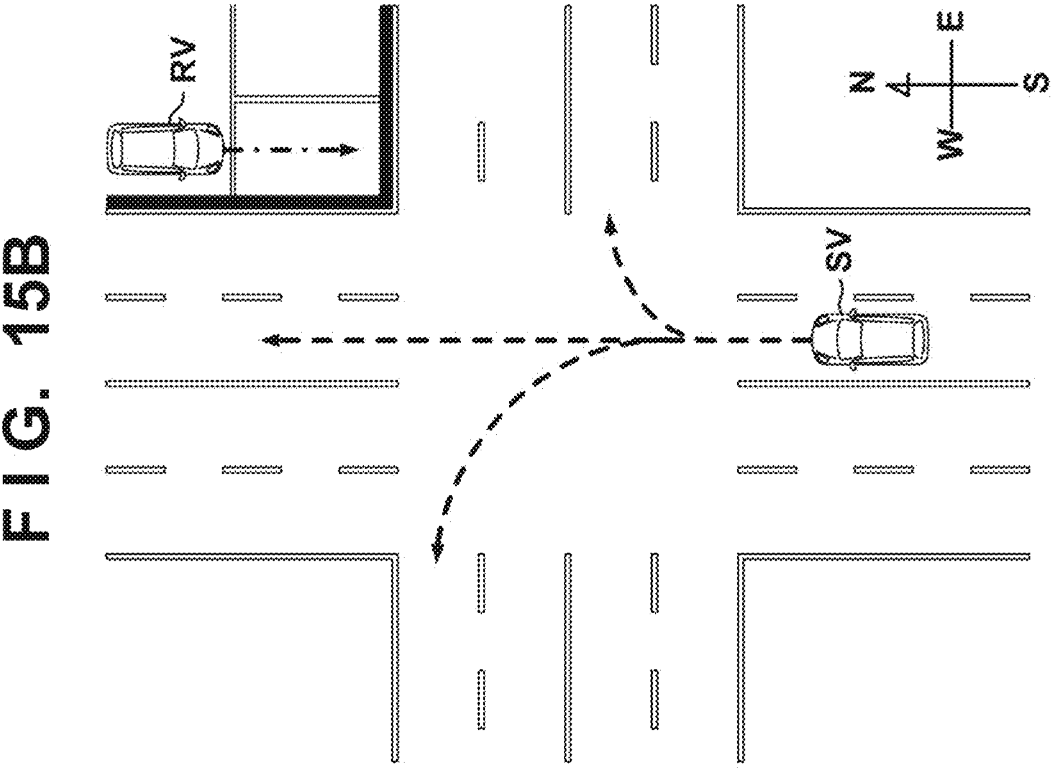
FIGS. 15A and 15B are diagrams for explaining an intersection between a self-vehicle and a surrounding vehicle.
Figure 15A:
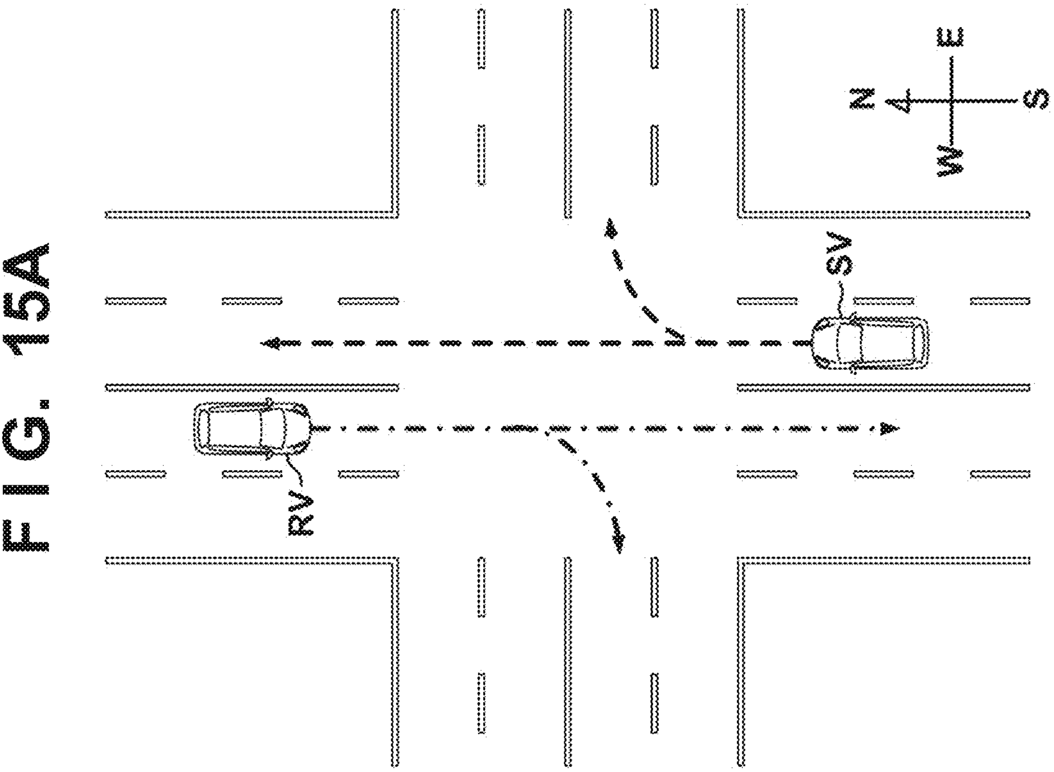

In step S504, the processing unit 21 (specifying unit 21*d*) determines whether or not the intersection between the self-vehicle SV and the surrounding vehicle RV will occur in the future based on the self-vehicle information and the surrounding vehicle information. For example, as illustrated in FIG. 15A, when the self-vehicle SV and the surrounding vehicle RV pass each other and then travel in directions away from each other, the processing unit 21 can determine that the intersection between the self-vehicle SV and the surrounding vehicle RV will not occur in the future. In addition, as illustrated in FIG. 15B, when the surrounding vehicle RV is traveling in a parking lot or the like and the self-vehicle SV and the surrounding vehicle RV are traveling in directions away from each other, the processing unit 21 can determine that the intersection between the self-vehicle SV and the surrounding vehicle RV will not occur in the future. When it is determined that the intersection between the self-vehicle SV and the surrounding vehicle RV will not occur in the future, the process proceeds to step S501, and when it is determined that there is a possibility that the intersection between the self-vehicle SV and the surrounding vehicle RV will occur in the future, the process proceeds to step S502.

In step S505, the processing unit 21 (specifying unit 21*d*) specifies the location where the self-vehicle SV and the surrounding vehicle RV intersect as a new intersection location CPn based on the self-vehicle information and the surrounding vehicle information acquired in step S502. For example, the processing unit 21 can specify a location where the traveling trajectory of the self-vehicle SV and the traveling trajectory of the surrounding vehicle RV intersect, as the new intersection location CPn, based on the traveling trajectory of the self-vehicle SV included in the self-vehicle information and the traveling trajectory of the surrounding vehicle RV included in the surrounding vehicle information.

In step S506, the processing unit 21 (registration unit 21*e*) registers the new intersection location CPn specified in step S505 in the intersection location database of the storage unit 22. When the number of registered intersection locations that can be registered in the intersection location database of the storage unit 22 is limited, the processing unit 21 sequentially deletes the old registered intersection locations in the intersection location database, and registers the new intersection location CPn in the intersection location database.

Figure 16:
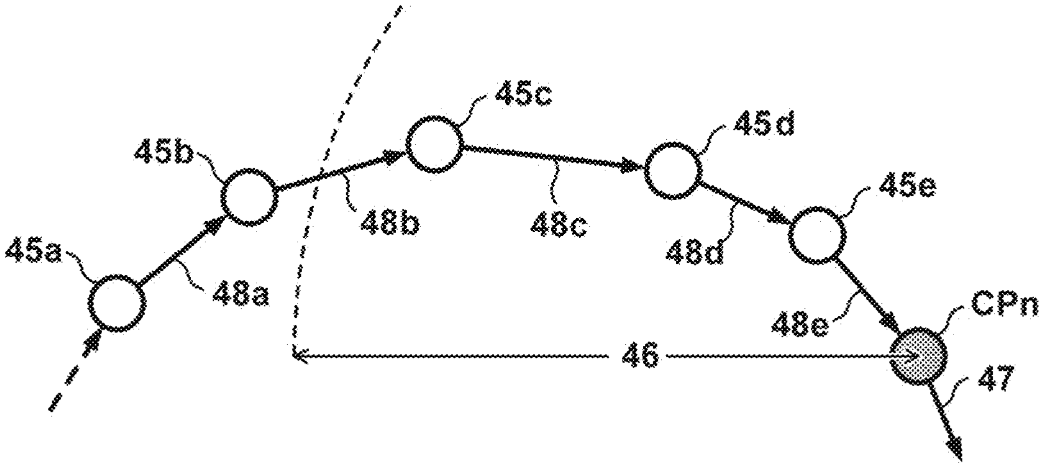
FIG. 16 is a diagram for explaining registration of a traveling trajectory (passing point) of a surrounding vehicle.

In step S507, the processing unit 21 (registration unit 21*e*) registers the traveling trajectory of the surrounding vehicle RV until reaching the new intersection location CPn, in the intersection location database of the storage unit 22, in association with the new intersection location CPn based on the surrounding vehicle information acquired so far. For example, as illustrated in FIG. 16, the traveling trajectory of the surrounding vehicle RV is configured by a data sequence of a plurality of passing points 45 through which the surrounding vehicle RV has passed, that is, a data sequence of the current location included in the surrounding vehicle information acquired so far. The plurality of passing points 45 may be referred to as a passing history (path history) regarding the surrounding vehicle RV. The processing unit 21 (registration unit 21*e*) registers, in the intersection location database of the storage unit 22, a passing point satisfying predetermined conditions among the plurality of passing points 45 as a traveling trajectory of the surrounding vehicle RV in association with the new intersection location CPn, and does not register other passing points (that is, deletes other passing points). The predetermined conditions may include, for example, a first condition that the passing point 45 is within a prescribed distance from the new intersection location CPn, and a second condition that a difference between an azimuth (passing azimuth) of the surrounding vehicle RV when passing through the passing point 45 and an azimuth (passing azimuth) of the surrounding vehicle RV when passing through the new intersection location CPn is less than a threshold value.

In the example of FIG. 16, since three passing points 45*c* to 45*e* among the plurality of passing points 45*a* to 45*e* are within the prescribed distance 46 from the new intersection location CPn, the first condition is satisfied. In addition, assuming that the passing azimuth of the surrounding vehicle RV at the new intersection location CPn is a reference azimuth 47, the difference between the reference azimuth 47 and the two passing azimuths 48*d* and 48*e* of the passing azimuths 48*a* to 48*e* of the surrounding vehicle RV at the respective passing points 45*a* to 45*e* is less than the threshold value. Therefore, the passing points 45*d* to 45*e* respectively corresponding to the passing azimuths 48*d* to 48*e* satisfy the second condition. In this case, the processing unit 21 (registration unit 21*e*) registers the passing points 45*d* to 45*e* satisfying the predetermined conditions (first condition and second condition), among the plurality of passing points 45, in the intersection location database of the storage unit 22 in association with the new intersection location CPn, and deletes the other passing points 45*a* to 45*c*. As a result, the amount of data stored in the intersection location database of the storage unit 22 can be reduced. The threshold value related to the difference between the passing azimuth (reference azimuth) of the surrounding vehicle RV at the new intersection location CPn and the passing azimuth of the surrounding vehicle RV at each passing point can be arbitrarily set according to the data amount of the storage unit 22. In addition, in FIG. 16, five passing points 45 are illustrated, but the number of passing points 45 is not limited to five, and there may be more passing points.

As described above, when none of the plurality of registered intersection locations stored in the storage unit 22 is present within the predetermined distance in front of the self-vehicle SV, the driving assistance device 100 according to the present embodiment sets the target area TA to the first area TA1 to perform driving assistance for the self-vehicle SV. On the other hand, when at least one registered intersection location CP among the plurality of registered intersection locations stored in the storage unit 22 is present within the predetermined distance D in front of the self-vehicle SV, the target area TA is set to the second area TA2 larger than the first area TA1 to perform driving assistance for the self-vehicle SV. As a result, driving assistance for the self-vehicle can be appropriately performed.

Summary of Embodiments

1. A driving assistance device (e.g. 100) of the above-described embodiments comprises:

a storage unit (e.g. 22) configured to store a plurality of intersection locations (e.g. CP) each indicating a location where a traveling trajectory of a self-vehicle (e.g. SV) and a traveling trajectory of another vehicle (e.g. OV) intersect with each other in a past;

an acquisition unit (e.g. 21*a*) configured to acquire surrounding vehicle information including a current location, a speed, and a traveling trajectory of a surrounding vehicle (e.g. RV) present around the self-vehicle, from the surrounding vehicle, through vehicle-to-vehicle communication;

a prediction unit (e.g. 21*b*) configured to predict a possibility of collision between the self-vehicle and the surrounding vehicle in a target area (e.g. TA) in front of the self-vehicle based on self-vehicle information including a current location, a speed, and a traveling trajectory of the self-vehicle and the surrounding vehicle information acquired by the acquisition unit; and an assistance unit (e.g. 21*c*) configured to perform driving assistance for the self-vehicle, which includes at least one of notification to an occupant of the self-vehicle and deceleration assistance for the self-vehicle, based on a prediction result of the prediction unit, wherein the prediction unit predicts, in a case where none of the plurality of intersection locations stored in the storage unit is present within a predetermined distance (e.g. D) in front of the self-vehicle, the possibility of collision by setting the target area to a first area (e.g. TA1), and predicts, in a case where at least one of the plurality of intersection locations stored in the storage unit is present within the predetermined distance, the possibility of collision by setting the target area to a second area (e.g. TA2) larger than the first area.

According to this embodiment, when the intersection location where the traveling trajectory of the self-vehicle and the traveling trajectory of another vehicle intersect with each other in the past is stored for a road including a plurality of lanes or the like, driving assistance for the self-vehicle can be appropriately performed such that the intersection location is within the target area where the driving assistance is performed. That is, the safety of the self-vehicle can be improved.

2. In the above-described embodiments, the storage unit stores each of the plurality of intersection locations in association with the traveling trajectory of the another vehicle, and the prediction unit predicts, in a case where the at least one intersection location is present within the predetermined distance, the possibility of collision based on the traveling trajectory of the another vehicle stored in the storage unit in association with the at least one intersection location.

According to this embodiment, it is possible to predict the possibility of collision of the self-vehicle by simpler processing based on the traveling trajectory of the another vehicle stored in the storage unit.

3. In the above-described embodiments, the prediction unit calculates, as an estimated intersection location (e.g. CPe), a location where a future traveling route of the surrounding vehicle estimated based on the surrounding vehicle information acquired by the acquisition unit and a future traveling route of the self-vehicle estimated based on the self-vehicle information intersect, and predicts an arrival time which is a time until the surrounding vehicle will arrive at the estimated intersection location, as the possibility of collision, and the assistance unit performs the driving assistance when the arrival time is equal to or less than a time threshold value, and does not perform the driving assistance when the arrival time is larger than the time threshold value.

According to this embodiment, it is possible to accurately predict the possibility of collision of the self-vehicle with a surrounding vehicle and to appropriately perform assistance driving for the self-vehicle according to the possibility of collision.

4. In the above-described embodiments, the storage unit stores each of the plurality of intersection locations in association with the traveling trajectory of the another vehicle, the prediction unit calculates, in a case where the at least one intersection location is present within the predetermined distance, a distance (e.g. 43) between the at least one intersection location and the surrounding vehicle based on the traveling trajectory of the another vehicle stored in the storage unit in association with the at least one intersection location, and predicts an arrival time which is a time until the surrounding vehicle will arrive at the at least one intersection location, as the possibility of collision, based on the distance and the surrounding vehicle information, and the assistance unit performs the driving assistance when the arrival time is equal to or less than a time threshold value, and does not perform the driving assistance when the arrival time is larger than the time threshold value.

According to this embodiment, it is possible to accurately predict the possibility of collision of the self-vehicle with a surrounding vehicle and to appropriately perform assistance driving for the self-vehicle according to the possibility of collision. In addition, the possibility of collision of the self-vehicle can be predicted by simpler processing based on the traveling trajectory of the another vehicle stored in the storage unit.

5. In the above-described embodiments, the assistance unit changes the time threshold value according to the speed of the surrounding vehicle in the surrounding vehicle information.

According to this embodiment, it is possible to accurately predict the possibility of collision of the self-vehicle according to the speed of the surrounding vehicle.

6. In the above-described embodiments, the time threshold value is set by an occupant of the self-vehicle.

According to this embodiment, it is possible to accurately predict the possibility of collision of the self-vehicle according to the request from the occupant of the self-vehicle.

7. In the above-described embodiments, the prediction unit calculates, as an estimated intersection location (e.g. CPe), a location where a future traveling route of the surrounding vehicle estimated based on the surrounding vehicle information acquired by the acquisition unit and a future traveling route of the self-vehicle estimated based on the self-vehicle information intersect, and predicts a stop location (e.g. 44) when the surrounding vehicle decelerates at a predetermined deceleration from a current location, as the possibility of collision, and the assistance unit performs the driving assistance when the stop location is ahead of the estimated intersection location in a traveling direction of the surrounding vehicle, and does not perform the driving assistance when the stop location is behind the estimated intersection location in the traveling direction of the surrounding vehicle.

According to this embodiment, it is possible to accurately predict the possibility of collision of the self-vehicle with a surrounding vehicle and to appropriately perform assistance driving for the self-vehicle according to the possibility of collision.

8. In the above-described embodiments, in a case where the speed of the surrounding vehicle in the surrounding vehicle information is out of a prescribed range, the assistance unit does not perform the driving assistance regardless of the possibility of collision predicted by the prediction unit.

According to this embodiment, it is possible to appropriately perform assistance driving for the self-vehicle according to the speed of the surrounding vehicle.

9. In the above-described embodiments, the driving assistance device further comprises:

a specifying unit (e.g. 21*d*) configured to specify a location where the self-vehicle and the surrounding vehicle intersect, as a new intersection location (e.g. CPn), based on the self-vehicle information and the surrounding vehicle information; and a registration unit (e.g. 21*e*) configured to register, in the storage unit, the new intersection location specified by the specifying unit.

According to this embodiment, the newly specified new intersection location can be stored in the storage unit, and the plurality of intersection locations stored in the storage unit can be appropriately updated.

10. In the above-described embodiments, the traveling trajectory of the surrounding vehicle in the surrounding vehicle information is configured by a plurality of passing points (e.g. 45) through which the surrounding vehicle passes, the registration unit registers a passing point satisfying predetermined conditions, among the plurality of passing points, in the storage unit in association with the new intersection location, and the predetermined conditions include a condition that a passing point is within a prescribed distance from the new intersection location and a condition that a difference between an azimuth of the surrounding vehicle when passing through a passing point and an azimuth of the surrounding vehicle when passing through the new intersection location is less than a threshold value.

According to this embodiment, since the passing point satisfying the predetermined conditions is selected from the plurality of acquired passing points and stored in the storage unit, the amount of data stored in the storage unit can be reduced.

11. In the above-described embodiments, the second area is longer than the first area at least in a traveling direction of the self-vehicle.

According to this embodiment, since the dimension of the target area can be changed such that the intersection location present in front of the self-vehicle is included, the safety of the self-vehicle can be improved.

The invention is not limited to the foregoing embodiments, and various variations/changes are possible within the spirit of the invention.

What is claimed is:

1. A driving assistance device, comprising:

a storage configured to store a plurality of intersection locations each indicating a location where a traveling trajectory of a self-vehicle and a traveling trajectory of another vehicle intersect with each other in a past; and a controller configured to:

acquire surrounding vehicle information including a current location, a speed, and a traveling trajectory of a surrounding vehicle, from the surrounding vehicle, through vehicle-to-vehicle communication;

predict a possibility of collision between the self-vehicle and the surrounding vehicle in a target area in front of the self-vehicle based on self-vehicle information including a current location, a speed, and a traveling trajectory of the self-vehicle and the acquired surrounding vehicle information; and perform driving assistance for the self-vehicle, which includes at least one of notification to an occupant of the self-vehicle and deceleration assistance for the self-vehicle, based on a prediction result of the possibility of collision, wherein the surrounding vehicle is a vehicle that is currently present around the self-vehicle and currently performs the vehicle-to-vehicle communication with the self-vehicle, wherein the controller is further configured to:

in a case where none of the plurality of intersection locations stored in the storage is present within a predetermined distance in front of the self-vehicle, set the target area to a first area and predict the possibility of collision in the target area set to the first area, and in a case where at least one of the plurality of intersection locations stored in the storage is present within the predetermined distance, set the target area to a second area larger than the first area and predict the possibility of collision in the target area set to the second area.

2. The driving assistance device according to claim 1, wherein the storage stores each of the plurality of intersection locations in association with the traveling trajectory of the another vehicle, and the controller is configured to predict, in a case where the at least one intersection location is present within the predetermined distance, the possibility of collision based on the traveling trajectory of the another vehicle stored in the storage in association with the at least one intersection location.

3. The driving assistance device according to claim 1, wherein the controller is configured to:

calculate, as an estimated intersection location, a location where a future traveling route of the surrounding vehicle estimated based on the surrounding vehicle information and a future traveling route of the self-vehicle estimated based on the self-vehicle information intersect, and predict an arrival time which is a time until the surrounding vehicle will arrive at the estimated intersection location, as the possibility of collision, and perform the driving assistance when the arrival time is equal to or less than a time threshold value, and not perform the driving assistance when the arrival time is larger than the time threshold value.

4. The driving assistance device according to claim 3, wherein the controller is configured to change the time threshold value according to the speed of the surrounding vehicle in the surrounding vehicle information.

5. The driving assistance device according to claim 3, wherein the time threshold value is set by an occupant of the self-vehicle.

6. The driving assistance device according to claim 1, wherein the storage stores each of the plurality of intersection locations in association with the traveling trajectory of the another vehicle, and the controller is configured to calculate, in a case where the at least one intersection location is present within the predetermined distance, a distance between the at least one intersection location and the surrounding vehicle based on the traveling trajectory of the another vehicle stored in the storage in association with the at least one intersection location, and predict an arrival time which is a time until the surrounding vehicle will arrive at the at least one intersection location, as the possibility of collision, based on the distance and the surrounding vehicle information, and perform the driving assistance when the arrival time is equal to or less than a time threshold value, and does not perform the driving assistance when the arrival time is larger than the time threshold value.

7. The driving assistance device according to claim 6, wherein the controller is configured to change the time threshold value according to the speed of the surrounding vehicle in the surrounding vehicle information.

8. The driving assistance device according to claim 6, wherein the time threshold value is set by an occupant of the self-vehicle.

9. The driving assistance device according to claim 1, wherein the controller is configured to:

calculate, as an estimated intersection location, a location where a future traveling route of the surrounding vehicle estimated based on the surrounding vehicle information and a future traveling route of the self-vehicle estimated based on the self-vehicle information intersect, and predict a stop location when the surrounding vehicle decelerates at a predetermined deceleration from a current location, as the possibility of collision, and perform the driving assistance when the stop location is ahead of the estimated intersection location in a traveling direction of the surrounding vehicle, and not perform the driving assistance when the stop location is behind the estimated intersection location in the traveling direction of the surrounding vehicle.

10. The driving assistance device according to claim 1, wherein, in a case where the speed of the surrounding vehicle in the surrounding vehicle information is out of a prescribed range, the controller is configured not to perform the driving assistance regardless of the predicted possibility of collision.

11. The driving assistance device according to claim 1, the controller is configured to:

specify a location where the self-vehicle and the surrounding vehicle intersect, as a new one of the intersection locations, based on the self-vehicle information and the surrounding vehicle information; and register the specified new one of the intersection locations in the storage.

12. The driving assistance device according to claim 11, wherein the traveling trajectory of the surrounding vehicle in the surrounding vehicle information is configured by a plurality of passing points through which the surrounding vehicle passes, the controller is configured to register a passing point satisfying predetermined conditions, among the plurality of passing points, in the storage in association with the new intersection location, and the predetermined conditions include a condition that a passing point is within a prescribed distance from the new intersection location and a condition that a difference between an azimuth of the surrounding vehicle when passing through a passing point and an azimuth of the surrounding vehicle when passing through the new intersection location is less than a threshold value.

13. The driving assistance device according to claim 1, wherein the second area is longer than the first area at least in a traveling direction of the self-vehicle.

14. The driving assistance device according to claim 1, wherein the controller is configured to set the target area to the second area such that the at least one of the plurality of intersection locations is included in the second area.

15. A driving assistance method, comprising:

storing a plurality of intersection locations each indicating a location where a traveling trajectory of a self-vehicle and a traveling trajectory of another vehicle intersect with each other in a past;

acquiring surrounding vehicle information including a current location, a speed, and a traveling trajectory of a surrounding vehicle, from the surrounding vehicle, through vehicle-to-vehicle communication;

predicting a possibility of collision between the self-vehicle and the surrounding vehicle in a target area in front of the self-vehicle based on self-vehicle information including a current location, a speed, and a traveling trajectory of the self-vehicle and the acquired surrounding vehicle information; and performing driving assistance for the self-vehicle, which includes at least one of notification to an occupant of the self-vehicle and deceleration assistance for the self-vehicle, based on a prediction result of the possibility of collision, wherein the surrounding vehicle is a vehicle that is currently present around the self-vehicle and currently performs the vehicle-to-vehicle communication with the self-vehicle, wherein, in a case where none of the plurality of intersection locations is present within a predetermined distance in front of the self-vehicle, the target area is set to a first area and the possibility of collision is predicted in the target area set to the first area, and wherein, in a case where at least one of the plurality of intersection locations is present within the predetermined distance, the target area is set to a second area larger than the first area and the possibility of collision is predicted in the target area set to the second area.

16. A non-transitory computer-readable storage medium storing a program for causing a computer to execute a driving assistance method, wherein the driving assistance method includes:

storing a plurality of intersection locations each indicating a location where a traveling trajectory of a self-vehicle and a traveling trajectory of another vehicle intersect with each other in a past;

acquiring surrounding vehicle information including a current location, a speed, and a traveling trajectory of a surrounding vehicle, from the surrounding vehicle, through vehicle-to-vehicle communication;

predicting a possibility of collision between the self-vehicle and the surrounding vehicle in a target area in front of the self-vehicle based on self-vehicle information including a current location, a speed, and a traveling trajectory of the self-vehicle and the acquired surrounding vehicle information; and performing driving assistance for the self-vehicle, which includes at least one of notification to an occupant of the self-vehicle and deceleration assistance for the self-vehicle, based on a prediction result of the possibility of collision, wherein the surrounding vehicle is a vehicle that is currently present around the self-vehicle and currently performs the vehicle-to-vehicle communication with the self-vehicle, wherein, in a case where none of the plurality of intersection locations is present within a predetermined distance in front of the self-vehicle, the target area is set to a first area and the possibility of collision is predicted in the target area set to the first area, and wherein, in a case where at least one of the plurality of intersection locations is present within the predetermined distance, the target area is set to a second area larger than the first area and the possibility of collision is predicted in the target area set to the second area.

* * * * *